US012280997B2

(12) United States Patent
Draayer et al.

(10) Patent No.: US 12,280,997 B2
(45) Date of Patent: Apr. 22, 2025

(54) JERK REDUCTION FOR LIFT TRUCKS

(71) Applicant: Hyster-Yale Materials Handling, Inc., Fairview, OR (US)

(72) Inventors: Nicholas M. Draayer, Portland, OR (US); Ryan McDermott, Fairview, OR (US); Edmund Stilwell, Oregon City, OR (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/213,984

(22) Filed: Jun. 26, 2023

(65) Prior Publication Data

US 2023/0331528 A1 Oct. 19, 2023

Related U.S. Application Data

(63) Continuation of application No. 16/552,849, filed on Aug. 27, 2019, now Pat. No. 11,807,508.

(Continued)

(51) Int. Cl.

| | |
|---|---|
| ***B66F 9/075*** | (2006.01) |
| ***B66F 9/24*** | (2006.01) |
| ***B66F 17/00*** | (2006.01) |

(52) U.S. Cl.

CPC ...... *B66F 9/07559* (2013.01); *B66F 9/07504* (2013.01); *B66F 9/0755* (2013.01); *B66F 9/24* (2013.01); *B66F 17/003* (2013.01)

(58) Field of Classification Search

CPC ........................... B66F 17/003; B66F 9/07559

See application file for complete search history.

(56) References Cited

U.S. PATENT DOCUMENTS

| | | | |
|---|---|---|---|
| 4,011,492 | A | 3/1977 | Murphy et al. |
| 4,014,218 | A | 3/1977 | Brandt |

(Continued)

FOREIGN PATENT DOCUMENTS

| | | | |
|---|---|---|---|
| AU | 201400714 | A1 | 10/2014 |
| CN | 116902879 | A | 10/2023 |

(Continued)

OTHER PUBLICATIONS

Emam et al., "A Monitoring Device of Forklifts Stability Triangle", vol. 43, No. 2, XP002796846, DOI: 10.24874/mvm.2017.43.02.02; Retrieved from Internet: http://oaji.net/a rtides/2019/766-1557768611. pdf on Jan. 14, 2020.

(Continued)

*Primary Examiner* — Mark C Hageman

(57) ABSTRACT

Systems and methods can prevent or reduce jerk during operation of a materials-handling vehicle that is unloaded or carrying a load. The vehicle comprises one or more user input devices configured to receive from an operator a request to perform an action and a processor. The processor is configured to determine, before performing the action requested by the operator, a force acting on the load carried by the materials-handling vehicle as a result of the action requested by the operator. The processor determines whether the force would result in a jerk if the action is performed as requested. If it is determined that the force would result in a jerk, the action is modified so as to reduce the force. If it is determined that the force would not result in a jerk, the materials-handling vehicle performs the action as requested by the operator without modification to reduce the force.

27 Claims, 13 Drawing Sheets

Related U.S. Application Data

(60) Provisional application No. 62/725,879, filed on Aug. 31, 2018.

(56) References Cited

U.S. PATENT DOCUMENTS

| | | | | |
|---|---|---|---|---|
| 4,074,794 | A | 2/1978 | Scholl | |
| 4,509,127 | A * | 4/1985 | Yuki | B66F 9/24 414/629 |
| 4,511,974 | A | 4/1985 | Nakane et al. | |
| 5,816,768 | A | 10/1998 | Yoo | |
| 6,050,770 | A | 4/2000 | Avitan | |
| 6,256,566 | B1 | 7/2001 | Kamiya et al. | |
| 6,279,686 | B1 | 8/2001 | Kaup | |
| 6,385,518 | B1 | 5/2002 | Rickers et al. | |
| 6,477,455 | B2 | 11/2002 | Panizzolo | |
| 6,985,795 | B2 | 1/2006 | Scotese | |
| 7,165,643 | B2 | 1/2007 | Bozem et al. | |
| 7,216,024 | B1 | 5/2007 | Abels et al. | |
| 7,706,947 | B2 | 4/2010 | Bozem et al. | |
| 8,140,228 | B2 | 3/2012 | McCabe et al. | |
| 8,543,261 | B2 | 9/2013 | Anderson et al. | |
| 8,731,785 | B2 | 5/2014 | McCabe et al. | |
| 8,744,648 | B2 | 6/2014 | Anderson et al. | |
| 9,002,557 | B2 | 4/2015 | Goncalves et al. | |
| 9,007,178 | B2 | 4/2015 | Nikitin et al. | |
| 9,139,408 | B2 | 9/2015 | Alveteg | |
| 9,169,110 | B2 | 10/2015 | Gerdes et al. | |
| 9,207,673 | B2 | 12/2015 | Pulskamp et al. | |
| 9,222,854 | B2 | 12/2015 | Singh et al. | |
| 9,358,975 | B1 | 6/2016 | Watts | |
| 10,494,789 | B2 | 12/2019 | Berkemeier et al. | |
| 10,507,826 | B2 | 12/2019 | Bort et al. | |
| 10,782,202 | B2 | 9/2020 | Bonnet et al. | |
| 11,305,650 | B2 | 4/2022 | Chandrasekar | |
| 11,760,615 | B2 | 9/2023 | Draayer et al. | |
| 11,807,508 | B2 | 11/2023 | Draayer et al. | |
| 2007/0208483 | A1 | 9/2007 | Rabin | |
| 2010/0204891 | A1 | 8/2010 | Biggerstaff | |
| 2012/0239262 | A1 | 9/2012 | Reinert et al. | |
| 2013/0124041 | A1 | 5/2013 | Belser et al. | |
| 2017/0123428 | A1 | 5/2017 | Levinson et al. | |
| 2018/0229988 | A1 | 8/2018 | Gault et al. | |
| 2020/0071144 | A1 | 3/2020 | Draayer et al. | |
| 2020/0399105 | A1 | 12/2020 | Draayer et al. | |

FOREIGN PATENT DOCUMENTS

| | | | |
|---|---|---|---|
| EP | 2045207 | A1 | 4/2009 |
| EP | 2233427 | B1 | 9/2011 |
| EP | 3406536 | A1 | 11/2018 |
| EP | 3059202 | B1 | 7/2019 |
| GB | 2290149 | A | 12/1995 |
| GB | 2356624 | A | 5/2001 |
| GB | 2356624 | B | 5/2001 |
| WO | 2004069568 | A1 | 8/2004 |
| WO | 2009130528 | A1 | 10/2009 |
| WO | 2009130718 | A1 | 10/2009 |
| WO | 2015121818 | A2 | 8/2015 |
| WO | 2017050358 | A1 | 3/2017 |

OTHER PUBLICATIONS

European Extended Search Report, for Appl. 19194545.0; Feb. 10, 2020.
First Office Action in Chinese Patent Application No. 201910822439.5; Mar. 2, 2022.
First Office Action in U.S. Appl. No. 17/009,568; Aug. 26, 2022.
First Office Action, for Appl. 19194545.0; Mar. 29, 2023.
First Office Action, U.S. Appl. No. 16/552,849 (May 4, 2022).
Machine translation WO2004069568 from espacenet. (Year: 2004).
Office Action, European Patent Office, Appl. No. 19194545.0 (Mar. 29, 2023).
Response to European Extended Search Report, for Appl. 19194545.0; filed Sep. 10, 2020.
Response to First Office Action, Chinese Pat. Appl. No. 201910822439.5 (Sep. 19, 2022).
Response to First Office Action, U.S. Appl. No. 16/552,849 (Sep. 2, 2022).
Response to First Office Action, U.S. Appl. No. 17/009,568 (Feb. 24, 2023).
Response to Second Office Action, U.S. Appl. No. 16/552,849 (Feb. 24, 2023).
Second Office Action, U.S. Appl. No. 16/552,849 (Dec. 2, 2022).
Second Office Action, U.S. Appl. No. 17/009,568 (Mar. 3, 2023).
Toyota Forklifts, "Toyota Material Handling System of Active Stability (SAS)"; Jun. 9, 2017; XP054980153, Retrieved from Internet: www.youtube.com/watch?v=yOB7gAwBe6o; retrieved on Jan. 14, 2020.
Response to European Patent Office in EP 19194545.0 (Apr. 24, 2023).
Office Action, U.S. Appl. No. 16/552,849 (Mar. 3, 2023).
Response to Office Action, U.S. Appl. No. 16/552,849 (Apr. 3, 2023).
Notice of Allowance, U.S. Appl. No. 16/552,849 (May 4, 2023).
Notice of Allowance, U.S. Appl. No. 16/552,849 (Jul. 24, 2023).
Notice of Allowance, U.S. Appl. No. 16/552,849 (Aug. 11, 2023).
Response to Office Action, U.S. Appl. No. 17/009,568 (Apr. 3, 2023).
Notice of Allowance, U.S. Appl. No. 17/009,568 (Apr. 19, 2023).
Notice of Allowance, U.S. Appl. No. 17/009,568 (Jul. 24, 2023).
Notice of Allowance, U.S. Appl. No. 17/009,568 (Aug. 14, 2023).
Response to Office Action, European Pat. Appl. No. 19194545.0 (Apr. 24, 2023).
Office Action, EPO Pat. Appl. No. 19194545.0 (Aug. 2, 2023).
Response to Office Action, European Pat. Appl. No. 19194545.0 (Oct. 23, 2023).
Office Action, Chinese Pat. Appl. No. 201910822439.5 (Feb. 2023).
Response to Office Action, Chinese Pat. Appl. No. 201910822439.5 (Jun. 2023).
Grant Notice, Chinese Pat. Appl. No. 201910822439.5 (Jun. 12, 2023).
"Jerk (physics) explained," Everything Explained Today, https://everything.explained.today/Jerk_(physics)/# :~:text=Jerk%20%28also%20known%20as%20jolt%29%20is%20the%20rate,a%20vector%20quantity%20%28having%20both%20magnitude%20and%20direction%29 (viewed Sep. 30, 2024).
"Jerk (physics)," Wikipedia, https://en.wikipedia.org/wiki/Jerk_%28physics%29 (viewed Sep. 30, 2024).
Quora, "What happens when you take the derivative of acceleration with respect to time?," https://www.quora.com/What-happens-when-you-take-the-derivative-of-acceleration-with-respect-to-time (viewed Sep. 30, 2024).

* cited by examiner

1100

| SKILL LEVEL | 3 (1106) | 2 (1104) | 1 (1102) |
|---|---|---|---|
| TRAVEL REDUCTION (1110) | 10% | 15% | 20% |
| ACCELERATION REDUCTION | 10% | 20% | 30% |
| TILT SPEED REDUCTION | 10% | 20% | 30% |
| CARRIAGE HEIGHT SPEED REDUCTION (1108) | 10% | 20% | 30% |

JERK REDUCTION FOR LIFT TRUCKS

RELATED APPLICATIONS

This application is a continuation of U.S. patent application Ser. No. 16/552,849, filed Aug. 27, 2019, entitled "DYNAMIC STABILITY DETERMINATION SYSTEM FOR LIFT TRUCKS," now U.S. Pat. No. 11,807,508, which claims priority to U.S. Provisional Patent Application No. 62/725,879, filed Aug. 31, 2018, entitled "DYNAMIC STABILITY DETERMINATION SYSTEM FOR LIFT TRUCKS." The entire disclosures of both of the foregoing patent applications are hereby incorporated by reference herein.

This application is also related to U.S. patent application Ser. No. 17/009,568, filed Sep. 1, 2020, also entitled "DYNAMIC STABILITY DETERMINATION SYSTEM FOR LIFT TRUCKS," now U.S. Pat. No. 11,760,615, which also claims priority to U.S. Provisional Patent Application No. 62/725,879. The entire disclosures of that patent application is hereby incorporated by reference herein.

TECHNICAL FIELD

The present disclosure relates to the field of powered vehicles configured to transport goods and materials.

BACKGROUND

Powered vehicles configured to transport goods and materials, such as forklift trucks, end-riders, center-riders, pallet trucks, walkies, and the like, may have a plurality of forces acting upon the vehicle during operation. These forces may dynamically change during operation as conditions of the vehicle change. For example, adjustments in the position of the goods and materials being transported, adjustments in the travel speed of the vehicle, and adjustments in a turn radius of the vehicle may cause changes in the forces acting upon the vehicle. Compensating for these changes in forces can help prevent the vehicle or load from becoming unstable during handling, which otherwise may cause the vehicle to tip over or lift a wheel and/or the load to come unsecured or topple. Toppling could result in injury to the operator of the vehicle, damage to the vehicle, damage to the load, and/or damage to the environment. Accordingly, operators of the vehicles are trained to avoid instability of the vehicle and load; however, human error may still result in instability of the vehicle or load.

Some legacy approaches to address instability of vehicles relied on compensating for the forces only when the vehicle is in a static, non-moving condition and/or only responding to the instability condition of the vehicle in a reactive fashion, viz. once the vehicle had entered the instability condition. Relying on compensating for the forces only when the vehicle is in the static, non-moving condition fails to take into consideration changes in the forces that may occur during operation of the vehicle. While responding to the instability condition in a reactive fashion improves upon the static, non-moving condition compensation, the approach provides only a limited ability for attempting to correct the instability condition.

BRIEF DESCRIPTION OF THE DRAWINGS

Examples will be readily understood by the following detailed description in conjunction with the accompanying drawings. To facilitate this description, like reference numerals designate like structural elements. Examples are illustrated by way of example, and not by way of limitation, in the figures of the accompanying drawings.

DETAILED DESCRIPTION

Figure 1:
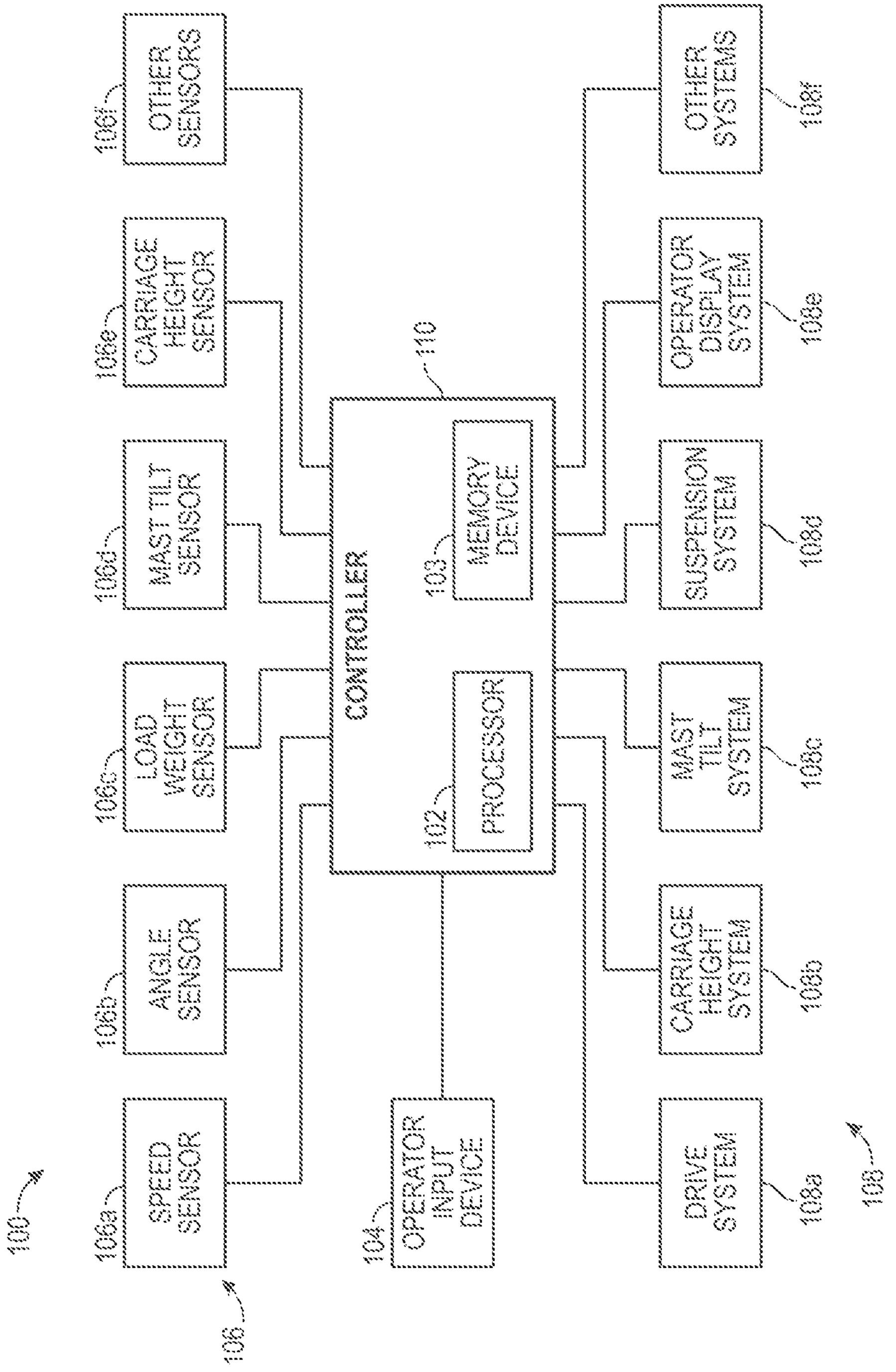
FIG. 1 illustrates an example control system that may be implemented in a powered vehicle.

In the following detailed description, reference is made to the accompanying drawings which form a part hereof wherein like numerals designate like parts throughout, and in which is shown by way of illustration examples that may be practiced. It is to be understood that other examples may be utilized and structural or logical changes may be made without departing from the scope of the present disclosure. Therefore, the following detailed description is not to be taken in a limiting sense, and the scope of examples is defined by the appended claims and their equivalents.

Aspects of the disclosure are disclosed in the accompanying description. Alternate examples of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described example. Various additional operations may be performed and/or described operations may be omitted in additional examples.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an example," or "in examples," which may each refer to one or more of the same or different examples. Furthermore, the terms "comprising," "including," "having," and the like, as used with respect to examples of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used in reference to the operation systems herein, the term "operation" may refer to a single procedure (such as adjusting a travel speed of a vehicle) that may be performed by the operation systems. As used in reference to the operator input device herein, the term "action" may refer to a procedure to be performed by the vehicle that may be made up of one or more operations to be performed by the operation systems.

Vehicle Control System

FIG. 1 illustrates an example control system 100 that may be implemented in a powered vehicle. The control system 100 may supplement operator control of the vehicle to inhibit unstable conditions of the vehicle. For example, the control system 100 may analyze conditions of the vehicle, forces acting upon the vehicle, operator inputs, environmental conditions around the vehicle, singularly or in any combination, and may modify vehicle performance limits and/or actions associated with the operator inputs to maintain the vehicle in a stable condition during operation.

The control system 100 may include a processor 102. The processor 102 may be included in a controller 110 of the control system 100 in some examples. In other examples, the processor 102 may be located separate from the controller 110. The circuitry of the controller 110 may include one or more processors (including the processor 102), one or more memory devices 103, one or more other electronic components, or some combination thereof. In particular, the controller 110 may include one or more memory devices 103 with instructions stored thereon, wherein the instructions, when executed by the processor 102, may cause the processor 102 to perform one or more of the operations described throughout this disclosure. In other examples, the one or more memory devices 103 with the instructions may be located separate from the controller 110.

The control system 100 may further include an operator input device 104, which may be a single device or a collection of devices. For example, the operator input device 104 may include, e.g., a steering wheel, a joystick, a control handle, a throttle input, one or more buttons, one or more levers, a touch screen display, a forward/reverse/neutral selector or other suitable input device, singularly or in any combination thereof. The operator input device 104 may detect inputs from an operator and may provide signals to the processor 102 that indicate the input received from the operator. In some examples, the operator input device 104 may further include an operator skill level input that allows the operator to indicate his or her skill level and/or certification level (collectively referred to as "operator skill level").

The control system 100 may further include one or more sensors 106. The sensors 106 may sense and/or measure one or more conditions of the vehicle and provide signals to the processor 102 that indicate values of the conditions of the vehicle. In other examples, the sensors 106 may sense and/or measure one or more environmental conditions around the vehicle and provide signals to the processor 102 that indicate values for items in the surrounding environment. In other examples, sensors 106 may sense and/or measure one or more conditions of the vehicle and provide signals to the processor 102 that indicate values of the conditions of the vehicle and may sense and/or measure one or more environmental conditions around the vehicle and provide signals to the processor 102 that indicate values for items in the surrounding environment. The sensors 106 may include a speed sensor **106*a*, an angle sensor 106*b*, a load weight sensor 106*c*, a load moment of inertia sensor, a mast tilt sensor 106*d*, a carriage height sensor 106*e*, and other suitable sensors for sensing and/or measuring vehicle conditions, a distance sensor 106**, a proximity sensor, a geofence sensor, a driving surface condition sensor, or other suitable sensors for sensing and/or measuring environmental conditions.

The speed sensor **106*a* may measure a travel speed and/or an acceleration/deceleration of the vehicle. In particular, the speed sensor 106*a* may measure a rotational speed of one or more wheels of the vehicle and indicate the rotational speed of the wheels to the processor 102. In some examples, the speed sensor 106*a* may be coupled to a drive wheel of the vehicle and may indicate the rotational speed of the drive wheel. In other examples, the speed sensor 106*a* may be coupled to two or more of the drive wheels of the vehicle and may indicate the rotational speeds of each of the drive wheels, which may allow for determination of differences in rotational speeds between each of the drive wheels. In some examples, the speed sensor 106*a*** may be coupled to a motor of the vehicle rather than the drive wheels and may indicate a speed of the motor. The travel speed, acceleration, and/or deceleration of the vehicle may be determined based on the rotational speeds of the drive wheels or the speed of the motor. In implementations where the motor transmits power to the drive wheels via a gear box or transmission, the ratio of the motor rotation compared to the wheel rotation may be factored into computation of the vehicle travel speed, acceleration, and/or deceleration. Where output is through a transmission capable of multiple ratios (also called "gears"), the selected transmission ratio or gear may further be used in computations to determine an accurate measurement of wheel rotation.

The angle sensor **106*b* may measure an angle of one or more of the wheels of the vehicle. In particular, the angle sensor 106*b* may measure an angle of one or more of the wheels relative to a base angle (which is often an angle of the wheels at which the vehicle would travel in a straight line) and may indicate the angle to the processor 102. The angle sensor 106*b* may be coupled to a steer wheel of the vehicle and may indicate the angle of the steer wheel relative to the base angle. In other implementations where steering is effected with different angular geometry or mechanisms, the angle sensor 106*b* may be configured to measure wheel angle (or steering mechanism angle) as appropriate so that processor 102** has an accurate measurement of steering or vehicle directional control.

The load weight sensor **106*c* may measure a weight of a load supported by a carriage of the vehicle. In particular, the load weight sensor 106*c* may measure a weight of a load supported by a support element (such as forks) and may indicate the weight to the processor 102. The load weight sensor 106*c*** may be coupled to the support element and/or an actuation element (such as a hydraulic cylinder, an electric cylinder, a linear actuator, a screw jack, a chain) that translates a position of the lift element and may indicate the weight of the load experienced by the support element and/or the actuation element.

The load moment of inertia sensor may measure, calculate, or estimate the center of gravity of a load supported by a carriage of the vehicle. In some implementations, the load moment of inertia can be calculated based on measurements from the load weight sensor 106*c* in combination with other sensors, e.g., mast tilt sensor 106*d*, carriage height sensor 106*e*, etc.

The mast tilt sensor 106*d* may measure a tilt of a mast of the vehicle. In particular, the mast tilt sensor 106*d* may measure an angle of the mast relative to a base angle (which is often an angle at which the mast is perpendicular to a surface on which the vehicle is located) and may indicate the angle to the processor 102. The mast tilt sensor 106*d* may be coupled to the mast and may indicate the angle of the mast relative to the base angle.

The carriage height sensor 106*e* may measure a height of a carriage of the vehicle. In particular, the carriage height sensor 106*e* may measure a height at which the carriage is located relative to a base height (which is often at a bottom of a stroke of the actuation element of the vehicle) and may indicate the height to the processor 102. The carriage height sensor 106*e* may be coupled to the carriage and/or the mast and may indicate the height of the carriage relative to the base height. In other implementations, the carriage height may be measured indirectly. For example, one or more sensors may be affixed to a carriage lift mechanism, and measure some aspect of the lift mechanism, e.g., extension of some lift mechanism component, volume of fluid flow, number of rotations of a lift motor or jack screw, or another suitable moving structure. From this measurement and with knowledge of the carriage and lift mechanism geometry, the carriage height may be computed.

Other suitable vehicle condition sensors 106 may include one or more wheel force sensors, a vehicle level sensor, a carriage level sensor, one or more support element force differential sensors, a mast tilt force sensor, a vehicle direction sensor, or some combination thereof. The wheel force sensors may measure the force experienced by one or more of the wheels affected by the body of the vehicle and/or the load. The vehicle level sensor may measure an orientation of the body of the vehicle relative to the level position of the body. The carriage level sensor may measure an orientation of the carriage relative to a level position of the carriage. The support element weight force sensors may measure forces experienced by different portions (such as different forks) of the support element and/or differentials between the forces experienced by different portions of the support element, or steer axle strain. The mast tilt force sensor may measure an amount of force to maintain the mast at the current tilt angle and/or the amount of force to cause the mast to transition to a different tilt angle. The vehicle direction sensor may determine a forward or reverse travel direction of the vehicle. The sensors 106 may indicate the values of the measurements to the processor 102.

The distance sensor 106 may measure a distance between the vehicle and one or more objects. Example distance sensors include, e.g., ultrasonic sensors, radiation emitting and receiving sensors, machine vision systems, or other suitable system.

The proximity sensor may detect when a vehicle is within one or more predetermined distances of a predetermined object. For example, a radio frequency identification (RFID) reader may communicate with the processor 102 and a RFID badge may be worn by a pedestrian. Another RFID badge may be included on another vehicle. When the pedestrian RFID badge is within one of the predetermined distances of the vehicle the RFID proximity sensor may send a signal to the processor 102 indicating which predetermined object is within which predetermined distance of the vehicle. Other types of sensors may be employed. For another example, a distance sensor 106, depending upon how it detects distances (e.g., using millimeter wave or another type of emission that be capable of imaging through intervening objects), may be able to detect and ascertain proximity to objects that are not otherwise within visible line of sight.

The geo-fence sensor may detect when a vehicle is within one or more predetermined areas. For example, a video camera may communicate with image analyzing software and may send a signal to the processor 102 indicating that the vehicle is in a predetermined area when the vehicle enters a predetermined area. Alternatively, the functionality of a geo-fence area may be emulated through the use of high-precision location services, e.g., radio beacons placed around a particular area of vehicle operation intended to be fenced, augmented GPS services such as D-GPS that may provide accuracy to within a few centimeters, ultra-wide-band beacons that offer precise ranging from known landmarks, or a combination of any of the foregoing, for a few examples.

The driving surface condition sensor may detect a condition of a driving surface, such as comprising a low coefficient material such as ice or comprising a height differential such as an edge of a dock or stairwell, and may send a signal to the processor 102 indicating the driving surface condition.

Other suitable environmental sensors may include sensors adapted to determine vehicle location (in addition or alternatively to the aforementioned geo-fence sensors). For example, a camera or range finder may be oriented to look up, away from the surface upon which a vehicle may be traveling. Where a location for vehicle operation includes both inside and outside locations, defined as the presence or absence of a roof or other covering, a camera or range finder may be able to immediately sense the presence of an overhead structure, and so provide an indication to processor 102 about whether the vehicle is located inside or outside. For another example, a temperature sensor may detect the ambient temperature around a vehicle. The ambient temperature may affect various operational characteristics, such as braking power, engine power, the possible presence of ice or snow (especially in conjunction with a sensor to determine positioning outside), and/or other parameters. A wind speed sensor, potentially useful in exposed exterior areas where a vehicle may not be sheltered from prevailing winds, may be useful to determine whether wind loads on a load being manipulated by a vehicle may need to be considered in setting operational limitations.

The control system 100 may further include one or more operation systems 108. The operation systems 108 may include systems that control one or more operations of the vehicle. The operation systems 108 may include a drive system 108*a*, a carriage height system 108*b*, a mast tilt system 108*c*, a suspension system 108*d*, an operator display system 108*e*, and/or one or more other systems 108*f*.

The drive system 108*a* may control the operation of the drive wheels and the steer wheels of the vehicle. For example, the drive system 108*a* may control the rotational speed, direction, acceleration, and deceleration of the drive wheels of the vehicle. Further, the drive system 108*a* may control angles of the steer wheels of the vehicle. The drive system 108*a* may include one or more of an engine, a motor, a transmission, a drive axle, steer wheel rotation actuators, or some combination thereof.

The carriage height system 108*b* may control the operation of the carriage height. For example, the carriage height system 108*b* may control a height of the carriage and changes in a height of the carriage. The carriage height system 108*b* may include one or more of a hydraulic cylinder, an electric cylinder, a linear actuator, a screw jack, a chain, or some combination thereof, that is coupled to the carriage and controls the height of the carriage.

The mast tilt system 108*c* may control the operation of the mast tilt. For example, the mast tilt system 108*c* may control a tilt of the mast and changes in tilt of the mast. The mast tilt system 108*c* may include one or more of a hydraulic cylinder, an electric cylinder, a linear actuator, a screw jack, or some combination thereof, that is coupled to the mast and controls the tilt of the mast.

The suspension system 108*d* may control the operation of suspension of the vehicle. For example, the suspension system 108*d* may control an amount of force, an amount of resistance, an amount of extension of the suspension of the vehicle, or some combination thereof. The suspension system 108*d* may include one or more of springs, shock absorbers, linkages, or some combination thereof, that support a body of the vehicle on the wheels of the vehicle or that support a portion of the body of the vehicle on another portion of the body of the vehicle.

The operator display system 108*e* may control one or more indications provided to an operator. For example, the operator display system 108*e* may control operator displays (such as lights and/or screen displays), sound emitting elements, haptic systems, or some combination thereof. The operator display system 108*e* may include one or more lights, screen displays (such as the touch screen display), speakers, actuators that may apply force, or some combination thereof, that can provide indications to the operator.

The other systems 108*f* may include, singularly or in any combination, energy source systems, operator comfort systems, or other suitable systems. The energy source systems may include one or more systems controlling access or use of an energy source (such as a battery and/or fuel tank of the vehicle) of the vehicle, such as energy source cutoff actuators and/or energy source regulators. The operator comfort systems may include one or more systems that control comfort features of the vehicle, such as operator seat cushioning elements, operator seat support suspension elements, and/or operator seat support actuators.

In some examples, the processor 102 receives signals from the operator input 104 and the sensors 106. Based on the signals from the sensors 106, the processor 102 sets limits for one or more of top speed, range of motion, and rate of change, as appropriate, for one or more of the operation systems 108. Therefore, as vehicle conditions and environmental conditions change, one or more of the limits for top speed, range of motion, and rate of change, as appropriate, may be changed for one or more of the operation systems 108. In response to receiving signals from the operator input 104, the processor 102 may provide signals to one or more of the operation systems 108 that cause the operation systems to implement operations to produce the actions desired by the operator. Depending on the vehicle and/or environmental conditions, requested actions may occur at a reduced top speed, range of motion, or rate of change compared to the vehicle's maximum capacity for each operation systems' 108 top speed, range of motion, and rate of change, or such desired actions may not occur.

Figure 2:
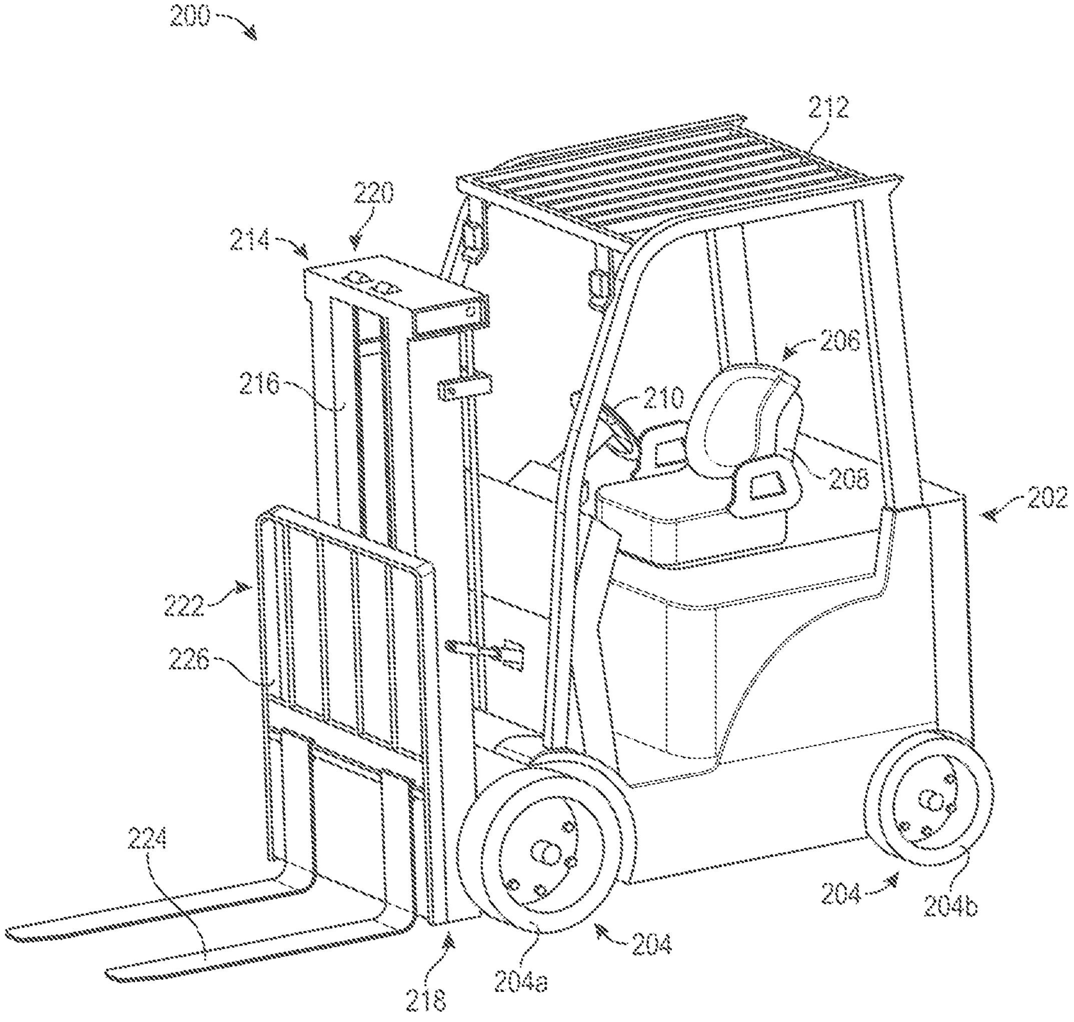
FIG. 2 illustrates an example powered vehicle that may implement the control system of FIG. 1.

FIG. 2 illustrates an example powered vehicle 200 that may implement the control system 100 of FIG. 1. The illustrated vehicle 200 is a counterbalance forklift truck. It is to be understood that control system 100 may be implemented in other vehicles, for example, end-riders, center-riders, pallet trucks, and/or walkies.

The vehicle 200 may include a body 202 supported on a surface by one or more wheels 204. The body 202 may include an operator compartment 206 with a seat 208 in which an operator of the vehicle 200 may sit. The vehicle 200 may include one or more operator input devices 104 (FIG. 1) located within the operator compartment 206. The operator input devices 104 may include a steering wheel 210, buttons, levers, throttle (which may be a throttle pedal), brake, or other suitable input or some combination thereof. The vehicle 200 may further include an overhead guard 212, implemented in the depicted embodiment as a cage, located over the operator compartment 206, wherein the overhead guard 212 may prevent or reduce the chance of objects falling on the operator.

The wheels 204 may include one or more drive wheels 204*a* and one or more steer wheels 204*b*. The drive wheels 204*a* may be fixed in a single direction and rotational force may be applied to the drive wheels 204*a* by the drive system 108*a* (FIG. 1) which can cause the vehicle 200 to move along the surface. The steer wheels 204*b* may be rotationally coupled to the body 202 and may be rotated to different angles by steer wheel rotation actuators of the drive system 108*a*, which can be used for steering the vehicle 200.

The vehicle 200 may further include front end equipment 214. The front end equipment 214 may be coupled to a side of the body 202. In the illustrated examples, the front end equipment 214 is coupled to the side of the body 202 at which the drive wheels 204*a* are located. In other examples, the front end equipment 214 may be located to the side of the body 202 where the steer wheels 204*b* are located. The body 202 of the vehicle 200 may counterbalance the front end equipment 214 and/or any carried or secured load about the drive wheels 204*a*.

The front end equipment 214 may include a mast 216. The mast 216 may be rotationally coupled to the side of the body 202. For example, the mast 216 may have a rotation point located toward a bottom end 218 of the mast 216, where the mast 216 may rotate about the rotation point causing a top end 220 of the mast to move toward or further away from the body 202 as the mast 216 is rotated.

The front end equipment 214 may further include a carriage 222. The carriage 222 may include a support element 224 and a backstop 226. In the illustrated example, the support element 224 includes two forks that are to engage with a load and lift the load. For example, the forks may engage with a pallet, where the pallet may have one or more items stacked upon the pallet. In other examples, the support element 224 may include other means to engage with and lift a load, e.g., roll clamp, carton clamp, etc. The support element 224 may be coupled to the backstop 226 and the backstop 226 may prevent or reduce the chance of the load from interfering with the mast 216 or contacting the user. The carriage 222 may be movably coupled to the mast 216 and may be translated vertically along the mast 216 to raise and lower the carriage 222. For example, the carriage 222 may be coupled to the mast 216 via a hydraulic cylinder, an electric cylinder, a linear actuator, a screw jack, a chain, or some combination thereof, which may allow the carriage to be vertically translated in relation to the mast 216. In some embodiments, carriage 222 may additionally or alternatively be configured to translate in a horizontal position, such as parallel to the surface upon which vehicle 200 may rest, to facilitate load positioning and placement where maneuvering space may otherwise be limited.

The vehicle 200 may include the speed sensor 106*a*. The speed sensor 106*a* may include or be implemented using one or more of, e.g., a rotary sensor, an optical sensor, a magnetic sensor, a hall-effect sensor, or some combination thereof. The speed sensor 106*a* may be coupled to one or more of the drive wheels 204*a*. The speed sensor 106*a* may measure the rotational speed of the drive wheels 204*a* and may provide a signal to the processor 102 that indicates the rotational speed of the drive wheels 204*a*. The processor 102 may determine a travel of the vehicle 200 based on the indication of the rotational speed of the drive wheels 204*a*.

In other examples, the speed sensor 106*a* may be coupled to an engine or motor of the vehicle 200 and may measure the rotational speed of the engine. The speed sensor 106*a* may provide a signal to the processor 102 that indicates the rotational speed of the engine. The processor 102 may determine a travel speed of the vehicle 200 based on the indication of the rotational speed of the engine.

The vehicle 200 may further include the angle sensor 106*b*. The angle sensor 106*b* may include one or more of, e.g., a rotary sensor, an optical sensor, a magnetic sensor, a hall-effect sensor, a rotary potentiometer, a linear potentiometer, or some combination thereof. The angle sensor 106*b* may be coupled to one or more of the steer wheels 204*b*. The angle sensor 106*b* may measure the angle of the steer wheels 204*b* and may provide a signal to the processor 102 that indicates the angle of the steer wheels 204*b*. The processor 102 may determine a direction of travel of the vehicle 200 based on the indication of the angle of the steer wheels 204*b*.

The vehicle 200 may further include the load weight sensor 106*c*. The load weight sensor 106*c* may include one or more of, e.g., a pressure transducer, a hydraulic pressure transducer, a tension measurement device, a strain measurement device, one or more tilt cylinder pins, or some combination thereof. The load weight sensor 106*c* may be coupled to the carriage 222, the support element 224, a hydraulic cylinder, an electric cylinder, a linear actuator, a screw jack, a chain, or some combination thereof. The load weight sensor 106*c* may measure the weight of a load supported by the support element 224 and may provide a signal to the processor 102 that indicates the weight of a load. The processor 102 may determine the weight and/or the mass of the load based on the indication of the weight of the load.

The vehicle 200 may further include a mast tilt sensor 106*d*. The mast tilt sensor 106*d* may include one or more of, e.g., a rotary sensor, an optical sensor, a magnetic sensor, a hall-effect sensor, a rotary potentiometer, a linear potentiometer, or some combination thereof. The mast tilt sensor 106*d* may be coupled to the front end equipment 214, or some portion thereof. The mast tilt sensor 106*d* may measure the tilt of the mast 216 and may provide a signal to the processor 102 that indicates the tilt of the mast 216. The processor 102 may determine the tilt of the mast 216 based on the indication of the tilt.

The vehicle 200 may further include a carriage height sensor 106*e*. The carriage height sensor 106*e* may include one or more of, e.g., an optical sensor, a magnetic sensor, a hall-effect sensor, a displacement sensor, a string potentiometer, a laser or similar rangefinder, or some combination thereof or another suitable mechanism to detect distance. The carriage height sensor 106*e* may be coupled to the carriage 222, the electric cylinder, the linear actuator, the screw jack, the chain, or some combination thereof. The carriage height sensor 106*e* may measure the height of the carriage 222 and may provide a signal to the processor 102 that indicates the height of the carriage 222. The processor 102 may determine the height of the carriage 222 based on the indication of the height.

The vehicle 200 may further include one or more of the other sensors 106. The other sensors 106 may measure forces applied to the wheels 204 by the body 202, tilt of the body 202, tilt of the carriage 222, the differential of forces experienced between portions (such as the different forks) of the support element 224, the amount of force to maintain or change the tilt of the mast 216, or other suitable vehicle condition, or some combination thereof. The other sensors 106 may provide one or more signals to the processor 102 that indicate the values of the measurements, where the processor 102 may determine one or more conditions of the vehicle 200 based on the indicated values.

The vehicle 200 may further include one or more environmental sensors 106. For example, a distance sensor 106 that may measure a distance between the vehicle and one or more objects, a proximity sensor that may detect when a vehicle is within one or more predetermined distances of a predetermined object, a geo-fence sensor that may detect when a vehicle is within one or more predetermined areas, a driving surface condition sensor that may detect a condition of a driving surface, or other suitable environmental sensor.

The vehicle 200 may further include the drive system 108*a*. The drive system 108*a* may control a rotational speed of the drive wheels 204*a*, a rotational acceleration and deceleration of the drive wheels 204*a*, an angle of the steer wheels 204*b*, or some combination thereof. In particular, the drive system 108*a* may receive one or more signals from the processor 102 and maintain or adjust a rotational speed of the drive wheels 204*a* and/or an angle or rate of angle change of the steer wheels 204*b* based on the signals.

The vehicle 200 may further include the carriage height system 108*b*. The carriage height system 108*b* may control a height of the carriage 222. In particular, the carriage height system 108*b* may receive one or more signals from the processor 102 and maintain or adjust a height, or a rate of height change, of the carriage 222 based on the signals.

The vehicle 200 may further include the mast tilt system 108*c*. The mast tilt system 108*c* may control a tilt of the mast 216. In particular, the mast tilt system 108*c* may receive one or more signals from the processor 102 and maintain or adjust the tilt, or a rate of tilt change, of the mast 216 based on the signals.

The vehicle 200 may further include the operator display system 108*e*. The operator display system 108*e*, or some portion thereof, may be located within the operator compartment 206. The operator display system 108*e* may control one or more indications provided to the operator. In particular, the operator display system 108*e* may receive one or more signals from the processor 102 and provide one or more indications to the operator based on the signals. The indications may include displaying an image on a screen display, changing a color of the screen display, lighting a light, emitting a sound, applying a force to the operator, or some combination thereof. Further, in some examples, the vehicle 200 may include one or more of the other systems 108*f*.

The processor 102 may receive signals from the sensors 106, where the signals indicate values associated with one or more conditions of the vehicle 200, one or more conditions of the environment surrounding the vehicle 200, or a combination of one or more conditions of the vehicle 200 and one or more conditions of the environment surrounding the vehicle 200. For examples, the conditions may include movement of the vehicle 200, a weight of a load supported by the support element, a position of the load, an object in the environment, a position in the environment, or other suitable conditions. The processor 102 may determine one or more forces acting upon a center of mass of the vehicle 200, as is described further throughout this disclosure. The processor 102 may determine one or more environmental conditions that may affect operation of the vehicle 200. The processor 102 may further receive signals from the operator input devices 104 of the vehicle requesting that the vehicle 200 perform an action, such as moving or adjusting a position of the load. Based upon the forces acting upon the center of mass, environmental conditions, and/or current conditions of the vehicle, the processor 102 may determine speed, rate of change, and/or travel limits for a requested action. The processor 102 may transmit one or more signals to the operation systems 108 that cause the operation system 108 to perform operations to implement the action within the speed, rate of change, and/or travel limits for the action, and may determine new speed, rate of change, and/or travel limits for other actions as the action occurs.

Center of Mass

Figure 3:
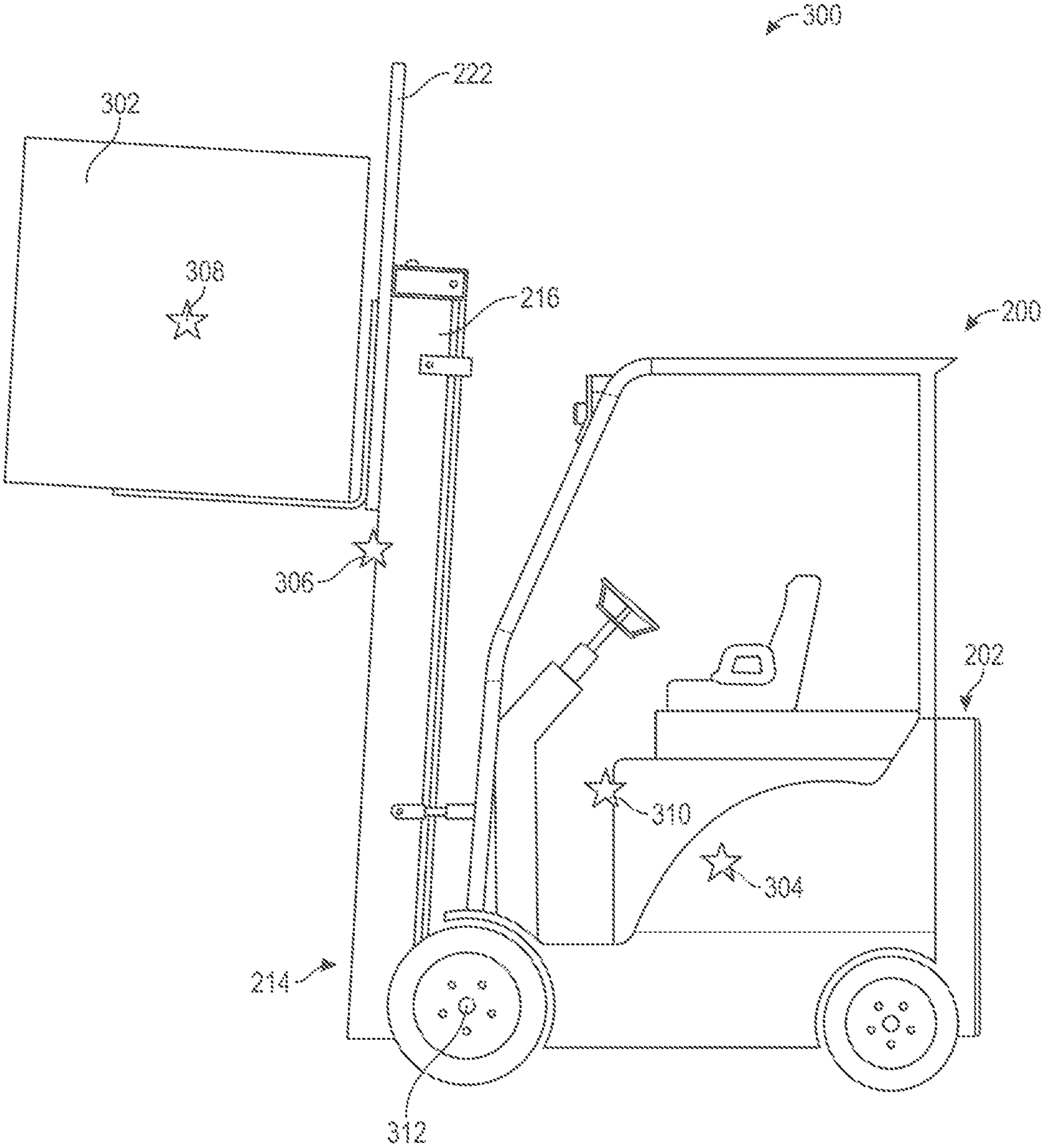
FIG. 3 illustrates an example arrangement of the vehicle of FIG. 2.

FIG. 3 illustrates an example arrangement 300 of the vehicle 200 of FIG. 2. In particular, FIG. 3 illustrates the vehicle 200 in a static, non-moving position with a load 302 supported by the support elements 224 (FIG. 2) of the vehicle 200. Further, FIG. 3 illustrates examples of a center of mass 304 of the body 202, a center of mass 306 of the front end equipment 214, and a center of mass 308 of the load 302, as well as a net center of mass 310 of the arrangement 300 (which may alternately be referred to as "a center of mass of the vehicle 200 in the arrangement 300"). The net center of mass 310 may be utilized for determining stability of the vehicle 200 as described further throughout this disclosure.

The net center of mass 310 may be determined based on the centers of mass of the components of the arrangement 300. In particular, the net center of mass 310 may be determined based on centers of mass of the components of the arrangement 300 that are static during operation of the vehicle 200 and centers of mass of the components of the arrangement 300 that may be dynamic during operation of the vehicle 200. The net center of mass 310 may be determined based on the center of mass 304 of the body 202 (which may be static during operation), the center of mass 306 of the front end equipment 214 (which may be dynamic during operation), and the center of mass 308 of the load 302 (which may be dynamic during operation). In arrangements where the vehicle 200 is not supporting the load 302, the net center of mass 310 may be determined based on the center of mass 304 of the body 202 and the center of mass 306 of the front end equipment 214.

The processor 102 (FIG. 1) may determine the center of mass 304 of the body 202 or may retrieve data indicating the center of mass 304 from the memory devices 103 (FIG. 1). The center of mass 304 of the body 202 is a point mass combination of the masses and positions of the centers of mass for components of the vehicle 200 that remain statically positioned with respect to a fixed datum on vehicle 200. In the embodiment depicted in FIG. 3, the datum used is the center of a drive axle 312 of the vehicle 200, that is, the midpoint of the drive axle 312 between the left drive tire and the right drive tire. For example, the center of mass 304 may be the weighted average of the centers of mass for each of the statically positioned components. In examples where the processor 102 determines the center of mass 304, the processor 102 may determine the weights of the statically positioned components, determine the centers of mass of the statically positioned components based on the weights, and determine the center of mass 304 of the body based on the centers of mass of the statically positioned components. In examples where the processor 102 retrieves data indicating the center of mass 304 from the memory devices 103, the center of mass 304 may have been input by an operator or manufacturer and stored in the memory devices 103, or previously determined and stored in the memory devices 103.

The processor 102 may further determine the center of mass 306 of the front end equipment 214. The center of mass 306 of the front end equipment 214 is a point mass combination of the masses and positions of the centers of mass for components of the front end equipment 214. For example, the center of mass 306 may be the weighted average of the centers of mass for each of the components of the front end equipment 214. The center of mass 306 may be dynamic during operation and may be dependent on a position of the carriage 222, a tilt of the mast 216, any other moveable portions of the front end equipment, e.g., fork position, any side shift, or some combination thereof.

The location of center of mass 306 at a particular position of the carriage 222 may be determined by determining the locations of the centers of mass 306 for the carriage 222 in multiple positions and extrapolation or interpolation from the values of the multiple positions to determine the location of the center of mass 306 at the particular position of the carriage 222. For example, locations of the center of mass 306 may be determined for three positions of the carriage 222: 1) the carriage 222 located at a fully lowered position; 2) the carriage 222 located between the fully lowered position and a fully raised position; and 3) the carriage 222 located at the fully raised position. The locations of the center of mass 306 for particular locations of the carriage 222 may then be interpolated from the locations of the center of mass 306 for the three positions of the carriage 222. Alternatively, one or more sensors 106 may be utilized to sense the actual position of carriage 222, and so calculate the center of mass 306 based upon the known position of carriage 222. Depending upon the requirements of a given implementation, this calculation may be performed in real time, may be determined using a pre-computed look-up table, or otherwise derived by any suitable technique.

The location of the center of mass 306 of the front end equipment 214 may further be dependent on a tilt of the mast 216. In particular, the processor 102 may receive an indication of angle of the tilt of the mast 216 and may adjust the center of mass 306 determined based on the height of the carriage 222. The processor 102 may retrieve data that indicates a point of rotation about which the mast 216 rotates and identify a signal from the mast tilt sensor **106*d* that indicates an angle of the tilt of the mast 216. Based on the point of the rotation and the angle, the processor 102 may adjust the center of mass 306 of the front end equipment 214 that was determined based on the height of the carriage 222 and the tilt of the mast 216. In some examples, adjusting the center of mass 306 may include normalizing to a three-dimensional coordinate system that may be superimposed over the vehicle, where a (0,0,0) coordinate of the three-dimensional coordinate system corresponds to the center 312 of the drive axle. In some implementations, this adjustment may be made as part of the initial or overall calculations of the center of mass 306. For example, where a look-up table (that may be stored in memory device 103) is employed, the look-up table may factor in or otherwise accept as inputs the tilt of the mast 216, in addition to the position of carriage 222 and support elements 224**.

The processor 102 may further determine the center of mass 308 of the load 302. The center of mass 308 of the load 302 is a point mass representation of the load 302 that is known, estimated, or calculable. For example, the center of mass 308 may be the weighted average of the centers of mass of each component comprising the load 302. The processor 102 may determine dimensions of the load 302, receive an input (such as from the operator input device 104 (FIG. 1)) that indicates the dimensions of the load 302, or retrieve data from the memory devices 103 that indicates the dimensions of the load 302 (which may have been previously input via the operator input device 104). For example, the other sensors **106*f* (FIG. 1) may include sensors that measure dimensions of the load 302 and provide a signal to the processor 102 used for determining the dimensions of the load 302. Further, the processor 102 may receive a signal from the load weight sensor 106*c* (FIG. 1) that indicates the weight of the load 302. The processor 102 may estimate the center of mass 308 based on the weight of the load 302, the dimensions of the load 302, or some combination thereof. In other examples, the processor may receive an input from the operator input 104 that indicates a center of mass 308 of the load 302**.

In some examples where the vehicle 200 includes the other sensors **106*f* of carriage level sensors, support element force differential sensors, and/or mast tilt force sensors, the processor 102 may estimate the location of the center of mass 308 based on the signals received from the other sensors 106*f*. For example, the processor 102 may determine a position of the center of mass 308 along a plane perpendicular to the backstop 226 of the carriage 222 based on a signal received from the carriage level sensors or the support element force differential sensors. The processor 102 may further determine a distance of the location of the center of mass 308 from the backstop 226 of the carriage 222 based on the signal based on the mast tilt force sensors. The processor 102 may determine an intersection between the plane and the distance from the backstop 226, which indicates the location of the center of mass 308** in the directions parallel to the support element.

The processor 102 may utilize the center of mass 304 of the body 202, the center of mass 306 of the front end equipment 214, and the center of mass 308 of the load 302 to determine a net center of mass 310 of the arrangement 300. For example, the processor 102 may assign weights to the centers of mass of the body 202, the front end equipment 214, and the load 302. The processor 102 may determine the net center of mass 310 based on the weights and the locations of the center of mass 304 of the body 202, the center of the mass 306 of the front end equipment 214, and the center of mass 308 of the load 302.

Figure 4:
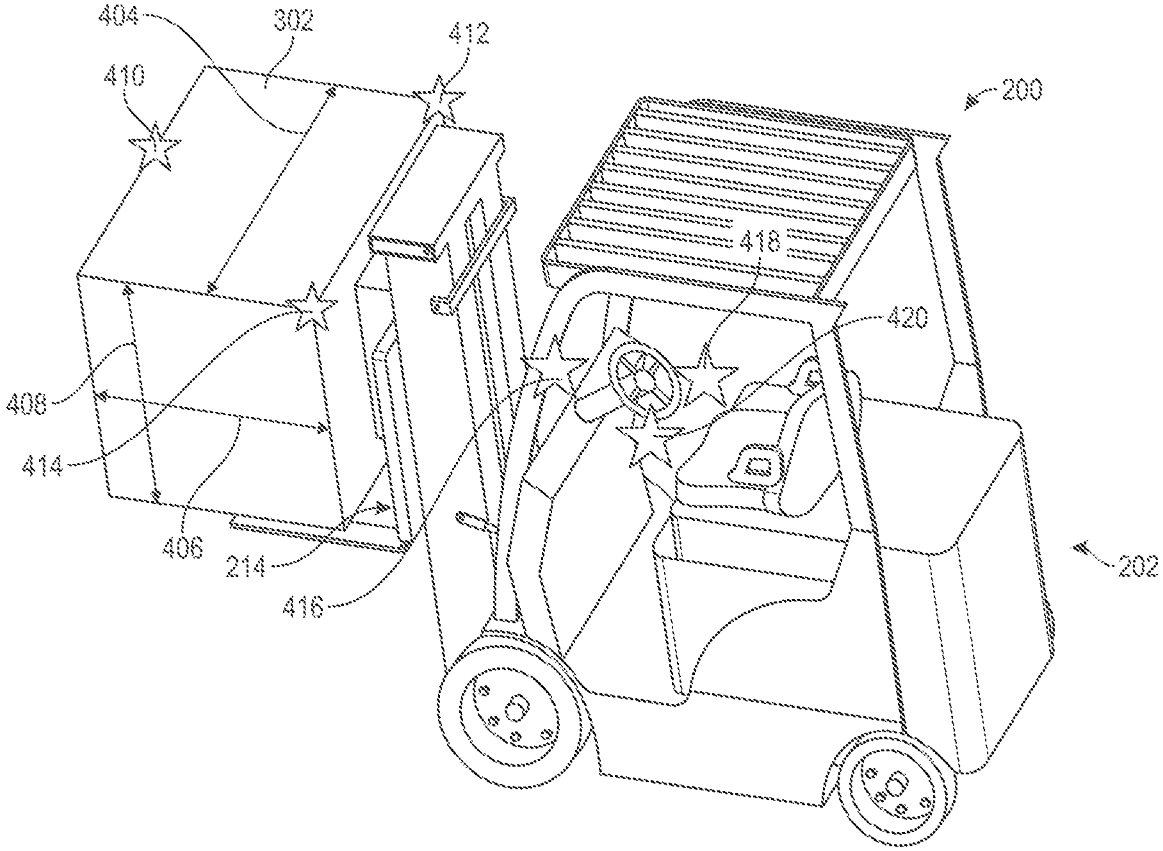
FIG. 4 illustrates the example arrangement where the processor is unable to determine a position of the center of mass.

In some examples, the processor 102 may be unable to determine a position of the center of mass 308 of the load 302, a shape of the load 302, and/or a size of the load 302. In these examples, the processor 102 may assume a predetermined shape and size of the load 302, and may assume worst-case center of masses of the load 302 for each scenario for performing stability analysis of the vehicle 200. FIG. 4 illustrates the example arrangement 300 where the processor 102 is unable to determine a position of the center of mass 308.

In the illustrated example, the processor 102 may assume a load 302 supported by the support element 224 (FIG. 2) to have a width 404, a length 406, and a height 408. The processor 102 may retrieve data from the memory devices 103 or receive a signal from the operator input device 104 (FIG. 1) that indicates the width 404, the length 406, and the height 408 to be assumed for the load 302. For example, the data retrieved from the memory devices 103 may indicate predefined values for the width 404, the length 406, and the height 408 of the load 302 based on a size of the vehicle 200, a size of the support element 224, a type of the support element 224, or some combination thereof. Alternatively, the predefined values may be based upon an average dimension of goods typically handled by the operator or owner of vehicle 200 (particularly when vehicle 200 is used primarily to move one type of goods that is relatively invariant in size), or another predefined typical size that may be designated by the operator or owner.

The processor 102 may determine the center of mass of the load 302 to be in a worst-case position from each potential tip axis of the vehicle 200, where the worst-case position may result in tip-over or lifting of a wheel of the vehicle 200. In instances where there are multiple potential tip axes, the processor 102 may identify multiple positions for the center of mass of the load 302. For example, the processor 102 identifies three positions for the center of mass of the load 302 in the illustrated example: 1) first worst-case center of mass 410 that corresponds to a first potential tip axis; 2) second worst-case center of mass 412 that corresponds to a second potential tip axis; and 3) third worst-case center of mass 414 that corresponds to a third potential tip axis. In some implementations, processor 102 may additionally or alternatively determine the worst-case position in terms of likely instability or toppling of load 302. In such a position, vehicle 200 may not be in danger of tip-over from wheel lift, but the load 302 may nevertheless become unstable or topple over. Such a determination may be useful where the load 302 cannot be fully secured to support elements 224, for example.

The processor 102 may determine one or more centers of mass for the arrangement 300 based on the center of mass 304 (FIG. 3) of the body 202, the center of mass 306 (FIG. 3) of the front end equipment 214, and one or more additional centers of masses as may be determined by the processor 102. For example, the processor 102 may determine the centers of mass for arrangement 300 based on the first worst-case center of mass 410, the second worst-case center of mass 412, and the third worst-case center of mass 414. Accordingly, the processor 102 may determine three centers of mass for the arrangement 300: 1) first center of mass 416 corresponding to the first worst-case center of mass 410; 2) second center of mass 418 corresponding to the second worst-case center of mass 412; and 3) third center of mass 420 corresponding to the third worst-case center of mass 414. In examples where the processor 102 determines the arrangement to have a plurality of centers of mass, the processor 102 may determine the stability of the vehicle 200 based on each of the centers of mass.

As described above, each determined center of mass may be expressed longitudinally relative to a fixed datum, such as the center of the drive axle 312. Laterally (left-right across vehicle 200), the datum may be expressed as a positive (right) or negative (left) offset from a centerline of vehicle 200, which runs along the longitudinal axis of vehicle 200. Alternatively, the lateral datum may be selected as another arbitrary point, such as the center of the left drive wheel. Vertically, the datum may be expressed as the top of the surface upon which vehicle 200 moves, where the surface forms a plane that contacts the wheels of vehicle 200. It will be understood that selection of any reference datum (laterally, longitudinally, and/or vertically) is somewhat arbitrary, and serves primarily as a fixed reference point by which the position of the center of mass may be expressed. In some implementations, a reference datum is selected as a single point from which a center of mass may be expressed in three coordinates (longitudinal, lateral, and vertical). However, the reference datum for a given axis need not be identical with the reference datums for other axes; other implementations may use two or more datums, possibly distinct for each axis.

Forces Acting on Center of Mass

Figure 5:
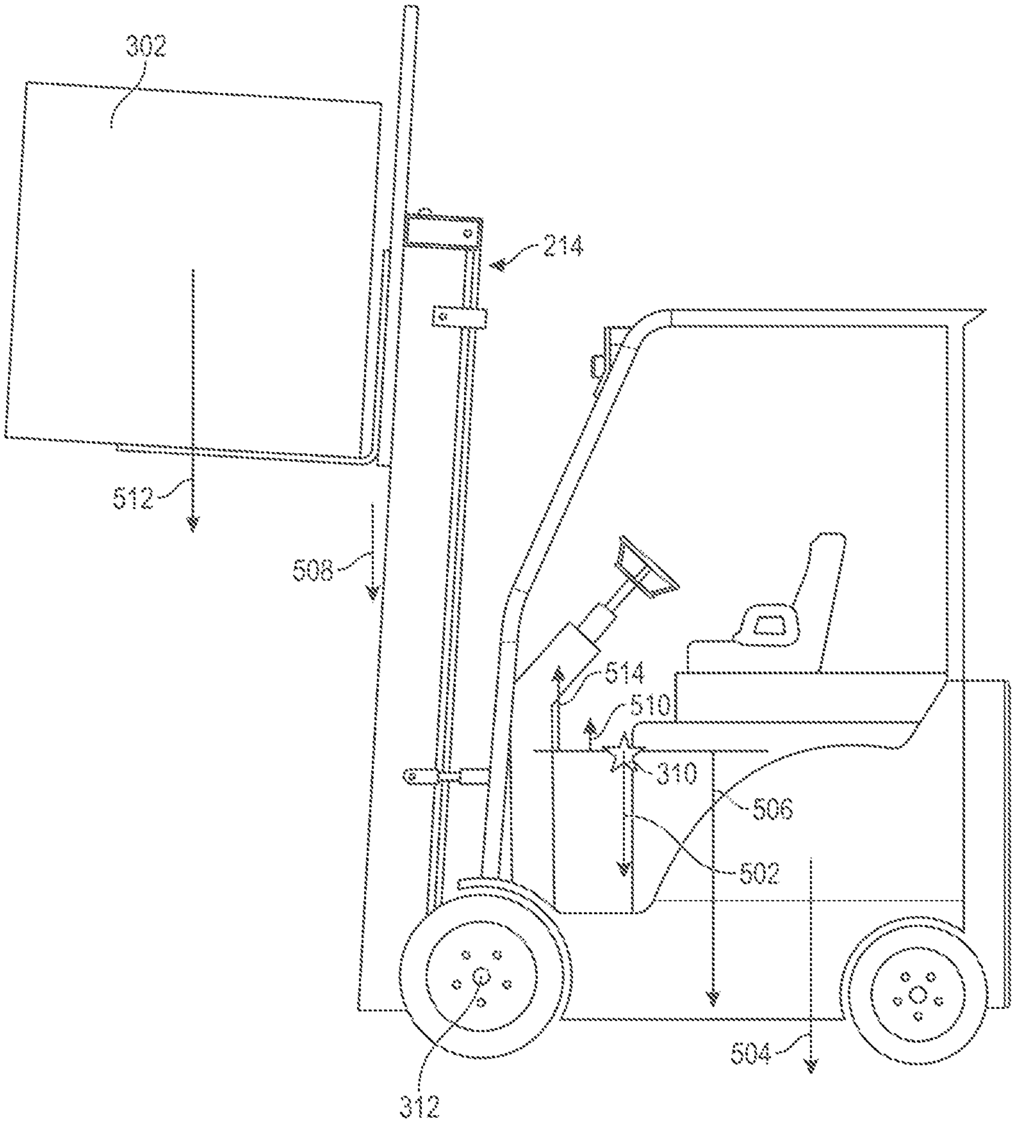
FIG. 5 illustrates the example arrangement of FIG. 3 showing example forces.

FIG. 5 illustrates the example arrangement 300 of FIG. 3 showing example forces. In particular, FIG. 5 illustrates the vehicle 200 in a static, non-moving position on a level surface with the load 302 supported by the support elements 224 (FIG. 2). Further, FIG. 5 illustrates example force vectors that act upon the arrangement 300 and a net resultant force vector 502 that acts upon the net center of mass 310 of the arrangement 300. The processor 102 (FIG. 1) may determine the force vectors that act upon the arrangement 300 based on signals received from one or more of the sensors 106 (FIG. 1) and may determine the net resultant force vector 502 that acts upon the net center of mass 310 based on the force vectors, as is described further below.

A force may act upon the body 202 of the vehicle 200, as represented by body force vector 504. The first force may be generated by gravity acting upon the body 202. The processor 102 may determine a direction and magnitude of the body force vector 504 based on data retrieved from the memory devices 103, signals received from one or more of the sensors 106, or some combination thereof. For example, the processor 102 may determine the direction of the body force vector 504 based on a signal received from the sensors 106 (such as the vehicle level sensor) that indicates an orientation of the body 202 (the illustrated example being a level orientation). Further, the processor 102 may determine the magnitude of the body force vector 504 based upon data retrieved from the memory devices 103 that indicates a mass or weight of the body 202, or a signal received from one of the sensors 106 (such as a wheel force sensor) that indicates a mass or weight of the body 202. The processor 102 may determine that the force acting on the body 202 causes a first force to act upon the net center of mass 310, as represented by the first force vector 506.

A force may act upon the front end equipment 214 of the vehicle 200, as represented by front end force vector 508. The force may be generated by gravity acting upon the front end equipment 214. The processor 102 may determine a direction and magnitude of the front end force vector 508 based on data retrieved from the memory devices 103, signals received from one or more of the sensors 106, or some combination thereof. For example, the processor 102 may determine the direction of the front end force vector 508 based on the signal received from the sensors 106 that indicates the orientation of the body 202. Further, the processor 102 may determine the magnitude of the front end force vector 508 based on data retrieved from the memory devices 103 that indicates the mass or weight of the front end equipment 214. The processor 102 may determine that the force acting on the front end equipment 214 causes a second force to act upon the net center of mass 310, as represented by second force vector 510. The processor 102 may determine a direction and magnitude of the second force vector 510 by normalizing the front end force vector 508 about the center 312 of the drive axle to determine the effect of the front end force vector 508 on the net center of mass 310. The processor 102 may treat the front end force vector 508 as acting on the center of mass 306 (FIG. 3) of the front end equipment 214 for determining the effect of the front end force vector on the net center of mass 310.

A force may act upon the load 302, as represented by load force vector 512. The force may be generated by gravity acting upon the load 302. The processor 102 may determine a direction and magnitude of the load force vector 512 based on data retrieved from the memory devices 103, signals received from one or more of the sensors 106, or some combination thereof. For example, the processor 102 may determine the direction of the load force vector 512 based on the signal received from the sensors 106 that indicates the orientation of the body 202. Further, the processor 102 may determine the magnitude of the load force vector 512 based on data retrieved from the memory devices 103 that indicates the mass or weight of the load 302, or a signal received from the sensors 106 (such as the load weight sensor **106*c*) that indicates the mass or the weight of the load 302. The processor 102 may determine that the force acting on the load 302 causes a third force to act upon the net center of mass 310, as represented by third force vector 514. The processor 102 may determine a direction and magnitude of the third force vector 514 by normalizing the load force vector 512 about the center 312 of the drive axle to determine the effect of the load force vector 512 on the net center of mass 310. The processor 102 may treat the load force vector 512 as acting on the center of mass 308 (FIG. 3) or a worst-case location (which may be a location within the load that has a highest moment of inertia for causing rotation about the center 312 of the drive axle) for determining the effect of the front end force vector on the net center of mass 310**.

The processor 102 may determine the net resultant force vector 502 that acts on the net center of mass 310 based on the first force vector 506, the second force vector 510, and the third force vector 514. In particular, the processor 102 may sum the first force vector 506, the second force vector 510, and the third force vector 514 to determine the net resultant force vector 502. The net resultant force vector 502 may represent static forces that act upon the net center of mass 310. The static forces includes forces that act upon the vehicle 200 regardless of travel speed, acceleration/deceleration, direction of travel of the vehicle 200, movement of the carriage 222 (FIG. 2), and movement of the mast 216 (FIG. 2).

Figure 6:
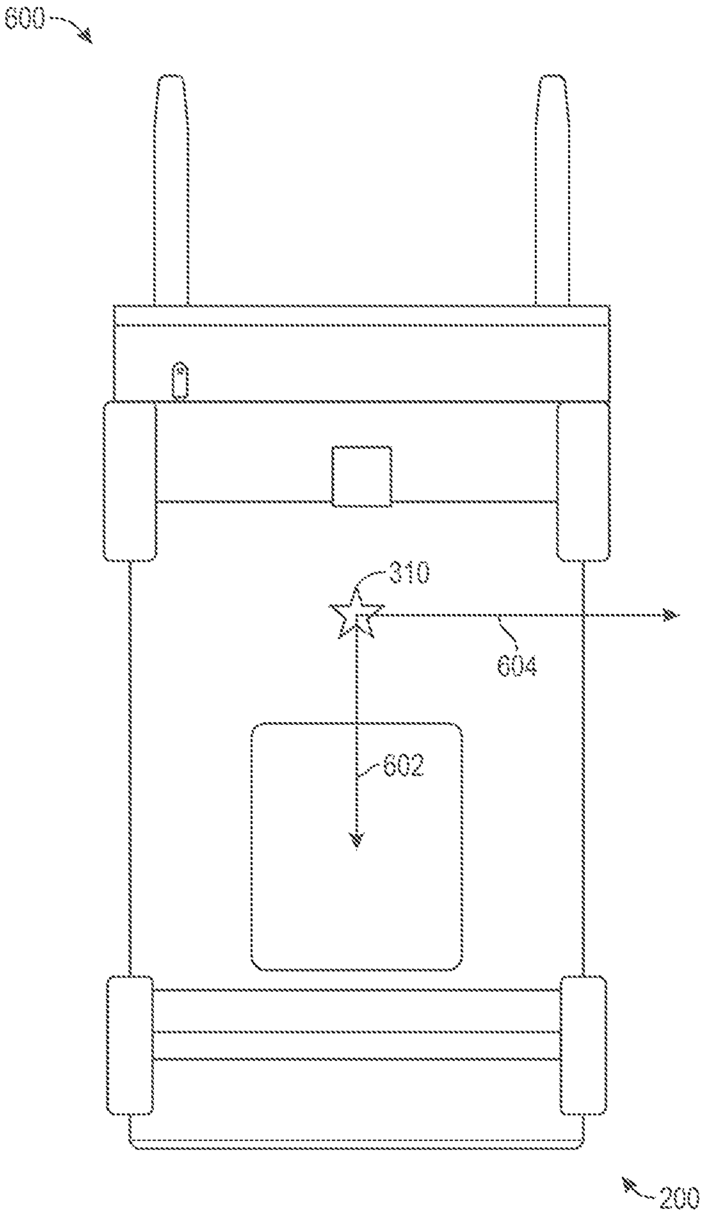
FIG. 6 illustrates a top view of another example arrangement of the vehicle of FIG. 2.

FIG. 6 illustrates a top view of another example arrangement 600 of the vehicle 200 of FIG. 2. In particular, FIG. 6 illustrates the vehicle 200 performing a turn and accelerating. Further, FIG. 6 illustrates example dynamic force vectors that act upon the arrangement 600 that may be taken into account when determining the net resultant force vector 502 (FIG. 5), as described in FIG. 5. In particular, the dynamic force vectors may include forces generated by movement of the vehicle 200 or portions thereof, such as change in height of the carriage 222 (FIG. 2), change in tilt of the mast 216 (FIG. 2), travel speed of the vehicle 200, acceleration/deceleration of the vehicle 200, and direction of travel of the vehicle 200.

A first force may act upon the net center of mass 310 due to acceleration of the vehicle 200, as represented by a first force vector 602. In particular, the first force may be generated by resistance of the mass of the arrangement 600 to a change in travel speed of the vehicle 200. The processor 102 may determine a direction and magnitude of the first force vector 602 based on data retrieved from the memory devices 103 (FIG. 1), a signal received from one or more of the sensors 106, a signal received from the operator input device 104, or some combination thereof. For example, the processor 102 may determine the direction of the first force vector 602 based on a direction of rotation of the drive wheels indicated by a signal from the speed sensor 106*a*, a requested direction of travel of the vehicle 200 indicated by a signal from the operator input device 104, or a measured steer wheel angle from a sensor 106 (FIG. 1). Further, the processor 102 may determine the magnitude of the first force vector 602 based on a mass or weight of the arrangement 600 indicated by data retrieved from the memory devices 103 or derived from signals received from the wheel force sensors and the load weight sensor 106*c* (FIG. 1), and an amount of acceleration indicated by a signal from the speed sensor 106*a* (FIG. 1).

A second force may act upon the net center of mass 310 due to the cornering of the vehicle 200, as represented by second force vector 604. In particular, the second force may comprise a centrifugal force generated by resistance of the mass of the arrangement 600 to a change in travel direction (and thus resisting the inertia tending to keep the mass of the arrangement 600 traveling in a straight line) of the vehicle 200. The processor 102 may determine a direction and magnitude of the second force vector 604 based on data retrieved from the memory devices 103, a signal received from one or more of the sensors 106, a signal received from the operator input device 104, or some combination thereof. For example, the processor 102 may determine the direction of the second force vector 604 based on an angle of the steer wheels of the vehicle 200 as indicated by a signal from the angle sensor 106*b* (FIG. 1) or a direction of the cornering as indicated by a signal from the operator input device 106. Further, the processor 102 may determine the magnitude of the second force vector 604 based on a mass or weight of the arrangement 600 indicated by data retrieved from the memory devices 103 or derived from signals received from the wheel force sensors and the load weight sensor 106*c*, a travel speed of the vehicle 200 indicated by the speed sensor 106*a*, and/or the degree of the cornering derived from a signal from the angle sensor 106*b* or a signal from the operator input device 104.

The processor 102 may further utilize dynamic forces (such as the first force represented by the first force vector 602 and the second force represented by the second force vector 604) in determining the net resultant force vector 502 (FIG. 5) at a moment in time. In particular, the processor 102 may continuously determine dynamic forces during operation of the vehicle 200 and determine the net resultant force vector 502 based on both the static forces and the dynamic forces. In some examples, the processor 102 may determine the dynamic forces and determine the net resultant force vector 502 at a rate of at least 100 times per second. The actual iterative speed of computation may depend upon the specifics and requirements of a given implementation. Some other dynamic forces that the processor 102 may determine and utilize include forces generated by acceleration and/or deceleration of the vehicle 200, direction of travel of the vehicle 200, changes in direction of travel of the vehicle 200, changes in the height of the carriage 222 (FIG. 2), changes in tilt of the mast 216 (FIG. 2), changes in weight of the load 302 (FIG. 3), and/or changes in tilt of the carriage 222.

Although the various force vectors 502, 504, 506, 508, 510, 512, 602 and 604 are depicted as being in a single direction (vertical or horizontal), it will be understood that these are simplified for illustrative purposes; vectors may be angular, with both vertical and horizontal (lateral and/or longitudinal) components, depending upon the particular configuration and orientation of vehicle 200. Thus, a given vector may have three x y and z components, corresponding variously to lateral, longitudinal, and vertical directions. For example, where vehicle 200 is traveling on an incline, force vectors 502-512 will have both vertical and horizontal components, as the applied force is angled relative to the travel surface. Where vehicle 200 is turning on an incline, the force vectors may have vertical, lateral, and longitudinal components. Processor 102, in embodiments, is configured to account for these angled force vectors. The actual direction and constituent components may be measured by the various sensors 106 described herein, which may be configured to sense physical aspects across three dimensions. For example, a three-axis accelerometer and/or three-axis gyroscope may be used as one or more sensors 106 to measure the orientation and movement of vehicle 200 in three dimensions. Each vector may be represented using a matrix corresponding to each constituent direction, and processor 102 may employ matrix mathematics in its computations.

Stability Analysis

Figure 7:
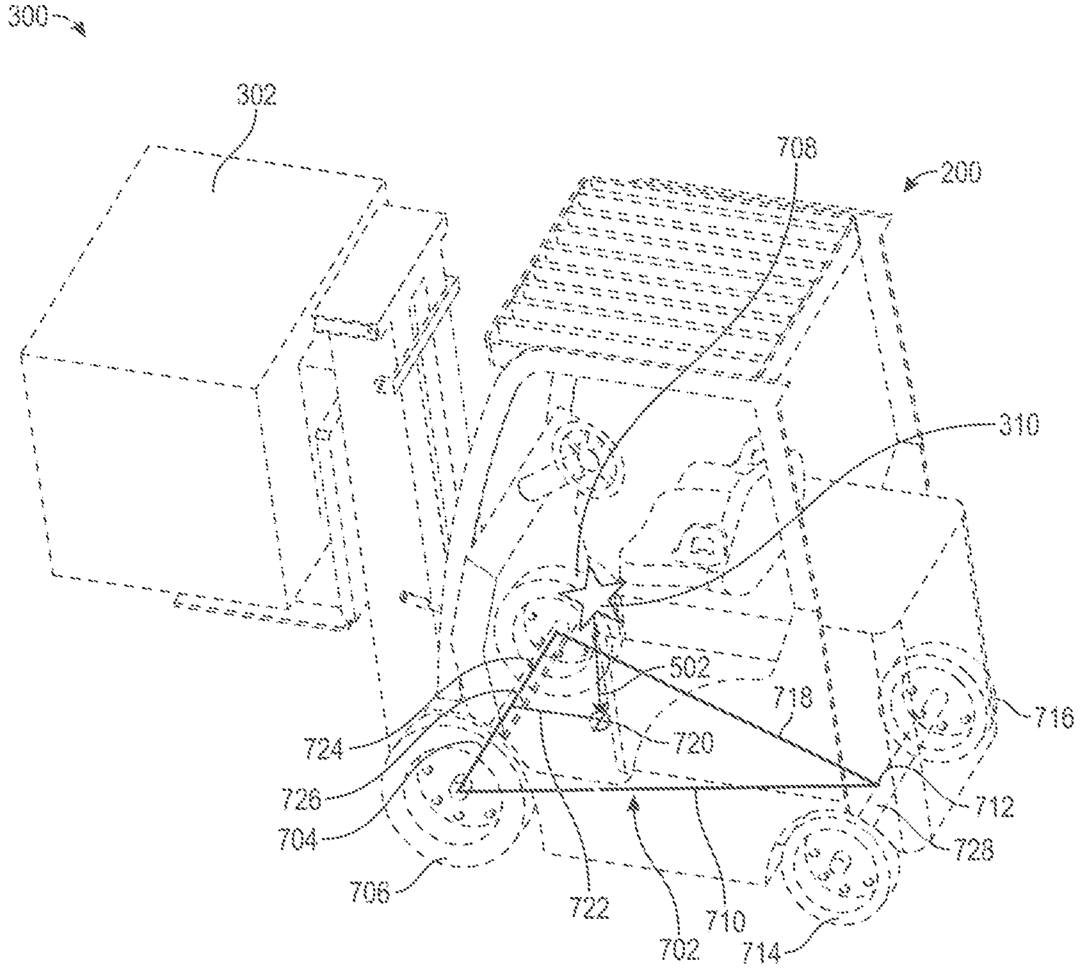
FIG. 7 illustrates a transparent perspective view of the arrangement of FIG. 3.

FIG. 7 illustrates a perspective view of the arrangement 300 of FIG. 3. In particular, FIG. 7 illustrates the vehicle 200 with the net center of mass 310 (FIG. 3) and the net resultant force vector 502 (FIG. 5). FIG. 7 illustrates the vehicle 200 in a static, non-moving position on a level surface with the load 302 supported by the support elements 224 (FIG. 2). Since the vehicle is in a static, non-moving position, only the static forces are taken into account in determining the net resultant force vector 502. It is to be understood that in instances where the vehicle 200 or some portion thereof is moving, both the static forces and the dynamic forces may be taken into account when determining the net resultant force vector acting on the center of mass of the vehicle 200.

Further, FIG. 7 illustrates a stability polygon 702 utilized by the processor 102 (FIG. 1) for determining the stability of the vehicle 200. The stability polygon 702 may define one or more potential tip axes, where the vehicle 200 may be at risk of tip-over or lifting of a wheel about the potential tip axes when the net resultant force acting upon the net center of mass 310 has a component of the net resultant force vector 502 that is directed from the net center of mass 310 above or across at least one potential tip axis. In the illustrated example, indications of the potential tip axes include: 1) a first line 704 that extends from a first drive wheel 706 to a second drive wheel 708 along the center 312 (FIG. 3) of the drive axle; 2) a second line 710 that extends from the first drive wheel 706 to a midpoint 712 between a first steer wheel 714 and a second steer wheel 716; and 3) a third line 718 that extends from the second drive wheel 708 to the midpoint 712. The stability polygon 702 formed by the potential tipping axes forms a triangle in the illustrated example. The triangle may have a side that extends along a first axle 726 of the vehicle 200 and a point of the triangle opposite from the side may be located at a midpoint of a second axle 728 of the vehicle 200. Based on the locations of the potential tip axes, the stability polygon 702 may be superimposed at a base of the vehicle 200, as depicted. As will be understood, the potential tip axes are defined at least in part by one or more of the above-described centers of mass as well as potential fulcrums or pivot points, defined by the geometry and construction of vehicle 200 and any load 302. Thus, in other examples, the potential tipping axes, and the size and shape of the stability polygon 702 may differ based on, e.g., the size of the vehicle 200, locations of the wheels of the vehicle 200, a steer axle pivot, the number of wheels of the vehicle, or some combination thereof, and may include one or more tipping points depending on the configuration of the vehicle.

The processor 102 may determine a relationship between the net resultant force vector 502 and the stability polygon 702. In particular, the processor 102 may retrieve data from the memory devices 103 (FIG. 1) that allows the processor 102 to determine the location of the stability polygon 702. The processor 102 may compare a direction in which the net resultant force vector 502 is directed with respect to the stability polygon 702 to determine whether the net resultant force vector 502 is directed through a portion of the stability polygon 702. The processor 102 may determine that the vehicle 200 is in a stable configuration when the net resultant force vector 502 is directed through the stability polygon 702 and that the vehicle 200 is in an unstable configuration and at risk of tip-over or lifting of a wheel when the net resultant force vector 502 is directed outside of the stability polygon 702. In the illustrated example, the net resultant force vector 502 is directed through the stability polygon 702 at point 720, and therefore is determined by the processor 102 to be in a stable configuration.

Processor 102 may compute the stability polygon 702, including each of its various potential tip axes, dynamically to address scenarios where vehicle 200 is both static and moving. Using inputs from the various sensors 106, such as, e.g., speed sensor 106*a*, angle sensor 106*b*, load weight sensor 106*c*, mast tilt sensor 106*d*, carriage height sensor 106*e*, plus other sensors 106 that may provide input into the loading and orientation of vehicle 200, processor 102 can compute the potential tip axes comprising stability polygon 702. As these configurations may change, e.g., the vehicle 200 may being moving or may stop, the carriage height may change as a load is lifted or lowered, the vehicle weight and balance may change as a load is picked up or removed, the mast tilt may change in response to load changes, etc., processor 102 typically will recompute the stability polygon 702 axes on a repeated basis. In some embodiments, processor 102 may recompute the stability polygon 702 on a regular basis, e.g., may update once or several times per second, or another suitable interval depending upon the needs of a given implementation. In some implementations, processor 102 may recompute the stability polygon 702 on a nearly continuous basis to ensure that vehicle handling and operation is maintained within predefined limits.

In other embodiments, processor 102 may recompute the stability polygon 702 each time a change in the signal from at least one of the sensors 106 is detected. In such an embodiment, the number of times that stability polygon 702 is recomputed in a given time frame may depend upon factors such as the sample rate of a given sensor 106. Such a change may indicate a potential change in the configuration of vehicle 200 and its load 302, that would potentially render invalid the computed stability polygon 702, and any subsequent control limits or modifications based upon the computed stability polygon 702. Each of the potential tip axes may be computed and recomputed substantially simultaneously. Further still, although stability polygon 702 is depicted as triangular with three potential tip axes, different configurations and/or geometries of vehicle 200 may require computation of additional tip axes, e.g., stability polygon 702 may effectively be a square, trapezoid, pentangle, hexagon, etc.

The processor 102 may further determine a distance or distances from the portion of the stability polygon 702 through which the net resultant force vector 502 is directed. In the illustrated example, the processor 102 determines that the point 720 is a distance 722 of side 724 of the stability polygon 702. The processor 102 may compare the distance 722 to a predetermined distance. In some examples, the processor 102 determines the distance 722 and based on the distance 722 may implement speed, rate of change, and/or travel limits for one or more of the operation systems 108. The processor 102 may also implement speed, rate of change, and/or travel limits for one or more of the operation systems 108 further based on other criteria such as operator skill level or environmental conditions. For example, implementing speed, rate of change, and/or travel limits for one or more of the operation systems 108 may include limiting a maximum drive speed of the vehicle 200, an acceleration and/or deceleration of the vehicle 200, a maximum height of the carriage 222 (FIG. 2), a speed of adjustment of the height of the carriage 222, a limit on the range of tilt of the mast 216 (FIG. 2), a speed of adjustment of tilt of the mast 216, or some combination thereof. Further, implementing speed, rate of change, and/or travel limits for one or more of the operation systems 108 may include, e.g., changing a color of a portion of an operator display, displaying a warning on the operator display, emitting a sound, applying a force or other type of haptic feedback to the operator (such as vibrating the seat 208 of the vehicle 200), or other suitable indication to the operator communicating why or that a speed, rate of change, and/or travel limits for one or more of the operation systems 108 has been limited, or some combination thereof.

Load Pitch Analysis

Figure 8:
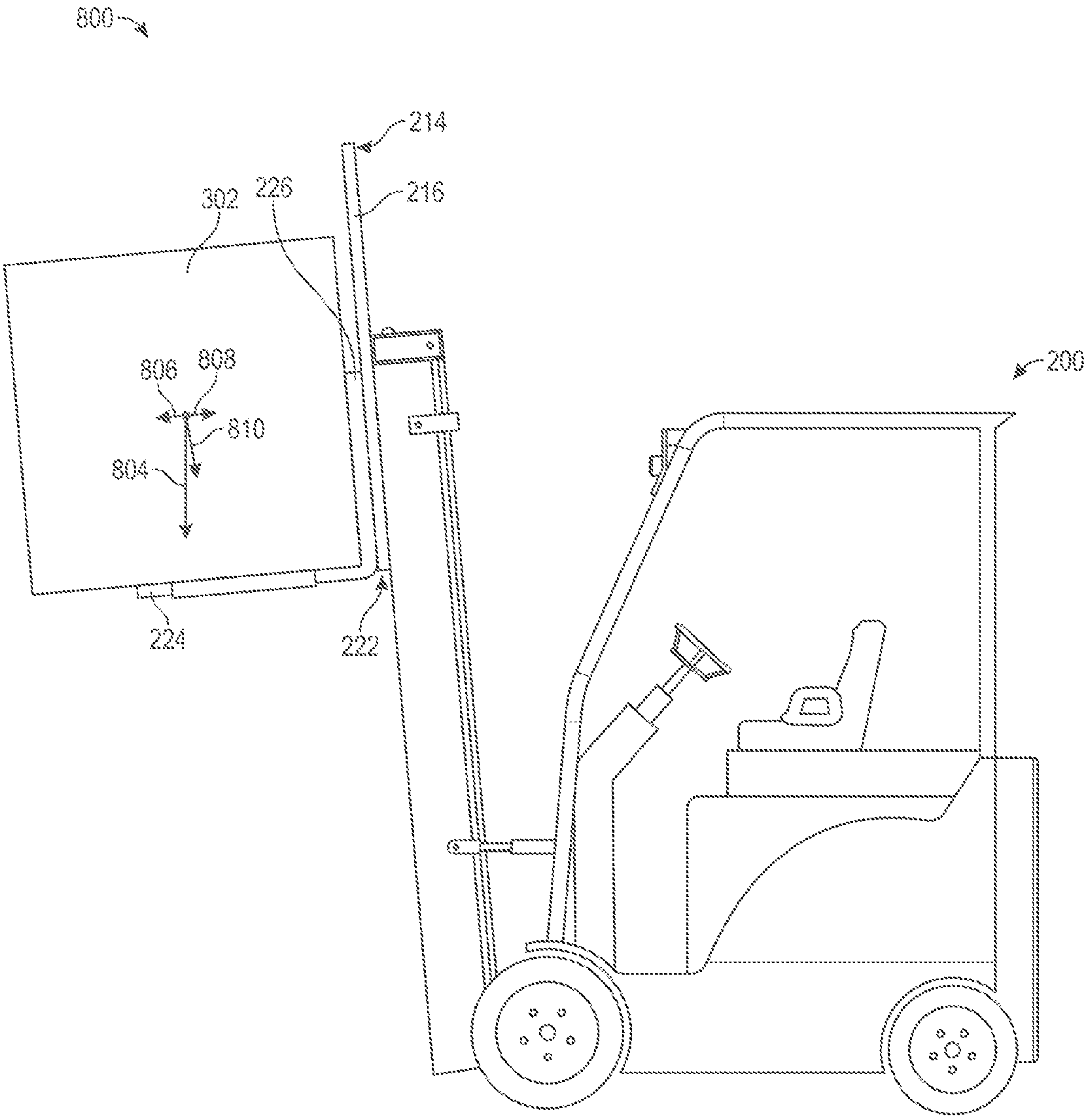
FIG. 8 illustrates a front end equipment arrangement.

FIG. 8 illustrates a front end equipment arrangement 800. In particular, FIG. 8 illustrates the support element 224 of the front end equipment 214 supporting a load 302. The mast 216 is illustrated tilted away from the vehicle 200 (which may be referred to as "tilted forward"). Further, FIG. 8 illustrates example force vectors that may be taken into account by the processor 102 (FIG. 1) in performing load pitch analysis. The processor 102 may determine the risk of the load 302 being pitched during operation of the vehicle 200.

The processor 102 may determine one or more forces acting upon the load 302 and the component of each of the forces that could cause the load 302 to be pitched off of the support element 224 during operation of the vehicle 200. A gravitational force acts upon the load 302, as represented by gravitational force vector 804. The processor 102 may determine a direction and/or a magnitude of the gravitational force vector 804 based on, e.g., an orientation of the vehicle 200, a tilt angle of the mast 216, a weight and/or mass of the load 302, an orientation sensor (such as a vehicle level sensor) to determine whether vehicle 200 is on an incline, or some combination thereof. For example, the processor 102 may determine a direction of the gravitational force vector 804 based on a signal indicating an orientation of the vehicle 200 received from the vehicle level sensor, a signal indicating an orientation of the carriage 222 received from the carriage level sensor, or some combination thereof. The processor 102 may determine a magnitude of the gravitational force vector 804 based on, e.g., data retrieved from the memory devices 103 (FIG. 1), a signal that indicates a mass and/or weight of the load 302 received from the load weight sensor 106*c* (FIG. 2), a signal that indicates the mass and/or weight of the load 302 received from the operator input device 104, or some combination thereof.

The processor 102 may further determine a component of the gravitational force vector 804 that could exceed the static friction force holding load 302 to the support element(s) 224, thus causing the load 302 to be pitched, as indicated by the first component vector 806. The first component vector 806 may be directed parallel to the support element 224 and away from the backstop 226 of the carriage 222. In particular, the processor 102 may perform calculations to determine a direction and magnitude of the first component vector 806 based on the gravitational force vector 804, a tilt of the mast 216, an orientation of the carriage 222, an orientation of the vehicle 200, vehicle speed, or some combination thereof. For example, the processor 102 may determine the direction of the first component vector 806 based on a signal that indicates a tilt angle of the mast 216 received from the mast tilt sensor 106*d* (FIG. 1), a signal that indicates the orientation of the carriage 222 received from the carriage level sensor, a signal that indicates the orientation of the vehicle received from the vehicle level sensor, or some combination thereof. The processor 102 may determine the magnitude based on the direction and magnitude of the gravitational force vector 804 and the direction of the first component vector 806.

The processor 102 may further determine an amount of resistive force that resists translation of the load 302 across the support element 224, as indicated by resistive force vector 808. The resistive force may be generated by friction between the support element 224 and the load 302. In particular, the processor 102 may determine a friction coefficient of the support element 224. The processor 102 may retrieve information indicating the friction coefficient for the support element 224 from the memory devices 103, receive a signal indicating the friction coefficient from the operator input device 104, or some combination thereof. The processor 102 may further determine a component of the gravitational force vector 804 directed perpendicular to the support element 224, as indicated by the second component vector 810. The processor 102 may perform calculations to determine a direction and magnitude of the second component vector 810 based on the gravitational force vector 804, the tilt of the mast 216, the orientation of the carriage 222, the orientation of the vehicle 200, or some combination thereof. The processor 102 may determine the amount of resistive force that may resist translation of the load 302 based on the friction coefficient of the support element 224 and the second component vector 810. In particular, the processor 102 may determine a maximum amount of resistive force that may be generated by the friction between the support element 224 and the load 302. Based on the mass of load 302 and its associated inertia when vehicle 200 is in motion, this resistive force may determine at least in part the maximum rate computed by processor 102 at which vehicle 200 may be slowed from a given speed while inhibiting load 302 from sliding off of support element 224. As deceleration causes load 302 to exert a force at least partially opposed to the resistive force that is proportional to the mass of load 302 and the rate of deceleration, viz. faster stopping results in more opposing force, processor 102 may limit the allowable deceleration rate to keep the opposing force less than the resistive force.

The processor 102 may further determine a risk and/or likelihood of the load 302 being pitched based on the maximum amount of resistive force. For example, the processor 102 may compare the first component vector 806 with the maximum amount of resistive force to determine the risk and/or likelihood of the load 302 being pitched. Further, the processor 102 may implement one or more speed, rate of change, and/or travel limits for one or more of the operation systems 108 to reduce the risk and/or likelihood of the load 302 being pitched based on the comparison. For example, the processor 102 may limit a range of tilt of the mast 216, a rate of change in the tilt of the mast 216, a rate of change in height adjustment of the carriage 222, an acceleration/deceleration of the vehicle 200, or some combination thereof, to maintain the first component vector 806 at a lower magnitude than the maximum amount of resistive force.

Processor 102 may further dynamically determine a maximum speed of vehicle 200 based on the maximum amount of resistive force. This maximum speed may be computed based at least partially upon the deceleration limits mentioned above to prevent load 302 from sliding off of support element 224, which translates into an estimated minimum stopping distance to bring vehicle 200 to a complete stop. Other factors that impact stopping distance, such as center of mass and weight of load 302, discussed above, as well as surface conditions that may be sensed by one or more sensors 106, may also factor into a maximum speed determination. The selection of a maximum speed may further be made with respect to operational and/or other predetermined limits, such as, e.g., an operator's desired maximum stopping distance, geolocation data indicating vehicle 200 being located in an area that offers only limited stopping distances, any sensed obstacles or potential obstacles in proximity to vehicle 200, etc. Thus, processor 102 may dynamically modify the maximum speed of vehicle 200 to ensure that the minimum stopping distance of vehicle 200 does not exceed a desired or otherwise specified maximum stopping distance. This will be described further below.

For brevity, analysis of the pitching of the load 302 based on gravitational force has been illustrated. However, it is to be understood that the processor 102 may further take into account the apparent centrifugal forces acting on the load 302 caused by the inertia of the load 302 during cornering of the vehicle 200. The processor 102 may also take into account translational forces acting on the load 302 caused by acceleration/deceleration of the vehicle 200. For example, the processor 102 may determine a direction and magnitude of the apparent centrifugal force based on data retrieved from the memory devices 103, a signal received from one or more of the sensors 106, a signal received from the operator input device 104, or some combination thereof. For example, the processor 102 may determine the direction of the apparent centrifugal force based on an angle of the steer wheels of the vehicle 200 as indicated by a signal from the angle sensor 106*b* (FIG. 1) or a direction of the cornering as indicated by a signal from the operator input device 106. Further, the processor 102 may determine the magnitude of the first force vector 602 based on a mass or weight of the load 302 indicated by data retrieved from the memory devices 103 or derived from signals received from the load weight sensor 106*c*, a travel speed of the vehicle 200 indicated by the speed sensor 106*a*, and/or the degree of the cornering derived from a signal from the angle sensor 106*b* or a signal from the operator input device 104. Although the first force vector 602 is depicted as directed rearward in FIG. 6, it will be understood that this is typically experienced during acceleration of vehicle 200. The first force vector 602 would direct frontward during deceleration of vehicle 200, and may be substantially zero while vehicle 200 is at a static speed, such as at rest or traveling at a constant velocity, viz. neither accelerating nor decelerating. The processor 102 may compare the apparent centrifugal force and/or a combined force generated by the apparent centrifugal force and the first component vector 806 with the maximum amount of resistive force to determine the risk and/or likelihood of the load 302 being pitched. Further, the processor 102 may implement one or more speed, rate of change, and/or travel limits for one or more of the operation systems 108 to reduce the risk and/or likelihood of the load 302 being pitched based on the comparison.

Preventative Stability and Load Pitch Operation

Figure 9:
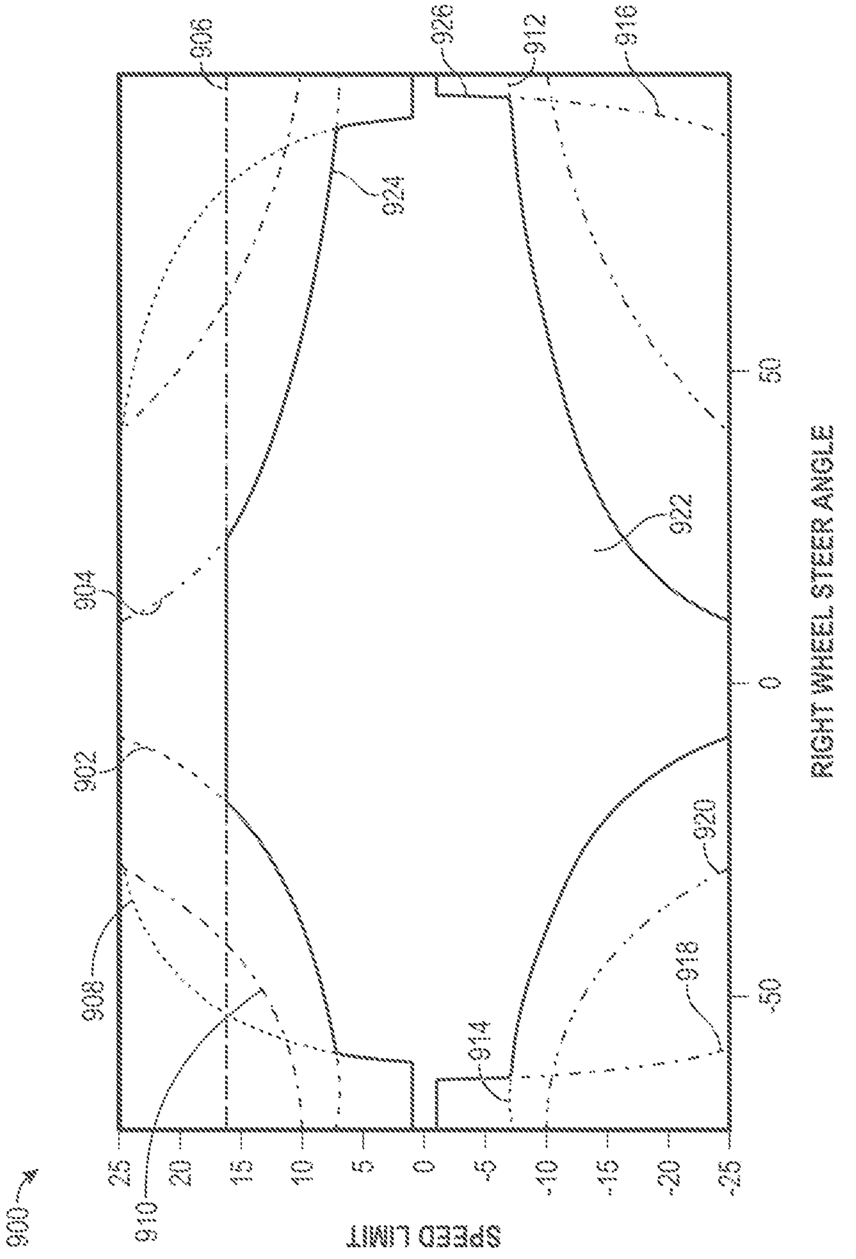
FIG. 9 illustrates an operational limit representation for implementing preventative instability operations.

FIG. 9 illustrates an operational limit representation 900 for implementing preventative stability operations. In particular, the processor 102 (FIG. 1) may generate one or more operational limit representations (such as the operational limit representation 900), which may be a graphical representation as illustrated. Each operational limit representation may correspond to an operation of the vehicle 200 (FIG. 2), such as, e.g., a travel speed of the vehicle 200, an acceleration/deceleration of the vehicle 200, a tilt of the mast 216 (FIG. 2) of the vehicle 200, a rate of change of the tilt of the mast 216, a height of the carriage 222 (FIG. 2) of the vehicle 200, and/or a rate of change in a height of the carriage 222. Each of the operational limit representations may indicate a limit of the corresponding operation based on one or more conditions of the vehicles. The illustrated operational limit representation 900 corresponds to a travel speed of the vehicle 200, and may be based on an angle of the steer wheels (such as the steer wheels 204*b* (FIG. 2)) of the vehicle 200. For brevity, the following description describes generation of the operational limit representation 900 corresponding to the travel speed of the vehicle 200. However, it is to be understood that the same analysis applies with respect to at least the other above-listed operations, and may be performed to generate operational limit representations for the other operations.

The processor 102 may generate the operational limit representation 900 based on a relationship of a net resultant force vector (such as the net resultant force vector 502 (FIG. 5)) of the vehicle 200 with a stability polygon (such as the stability polygon 702 (FIG. 7)) of the vehicle 200, a load pitch analysis associated with a load (such as the load 302 (FIG. 3)) supported by the vehicle 200, or some combination thereof. For example, the processor 102 may determine a current net resultant force vector and determine a current risk and/or likelihood of a load, such as load 302, being pitched or otherwise toppling and/or vehicle 200 overturning or lifting one or more wheels.

The processor 102 may then determine maximum values of the operation corresponding to each of the instability conditions of the vehicle 200 and the risk and/or likelihood of the load 302 being pitched or toppling and/or vehicle 200 overturning or lifting a wheel based on the current conditions of the vehicle 200. In the illustrated example, the processor 102 determines the maximum travel speed of the vehicle 200 for each angle of the steer wheel based on the conditions of the vehicle 200. The conditions of the vehicle 200 may include a mass or weight of the load 302 being supported by the vehicle 200, a tilt of a mast of the vehicle 200, a height of a carriage of the vehicle 200, an orientation of the vehicle 200, an orientation of the carriage, or some combination thereof. For example, the processor 102 may determine the maximum travel speeds of the vehicle 200 for the current angle of the steer wheel that would result in instability of the vehicle 200, such as toppling or lifting a wheel, based on the stability polygon and pitching of the load 302 based on the load pitch analysis, and may plot the maximum travel speeds on the operational limit representation 900.

In the illustrated example, plotted maximum travel speed representations based on the angle of the steer wheel illustrated include: forward travel left lateral stability line 902; forward travel right lateral stability line 904; forward travel longitudinal stability line 906; forward travel stop pitch line 908; forward travel centrifugal pitch line 910; reverse travel left lateral stability line 912; reverse travel right lateral stability line 914; reverse travel left lateral stop stability line 916; reverse travel right lateral stop stability line 918; and reverse travel centrifugal pitch line 920. Forward travel may correspond to vehicle travel with the load located on a side of the vehicle in the direction of travel and reverse travel may correspond to vehicle travel with the load located on a side of the vehicle opposite from the direction of travel. For example, the front of vehicle 200 would correspond to the side of the vehicle in the direction of forward travel and opposite the direction of reverse travel. Left lateral stability may correspond to a tip point located toward a left side of the vehicle 200 (such as the tip axis represented by second line 710 (FIG. 7)), right lateral stability may correspond to a tip axis located toward a right side of the vehicle 200 (such as the tip axis represented by third line 718 (FIG. 7)), and the longitudinal stability may correspond to a tip point located toward the load (such as the tip point represented by first line 704 (FIG. 7)). Stop pitch may correspond to pitch caused by gravitational forces that may cause pitching of the load (such as the component of gravitational force illustrated by the first component vector 806 (FIG. 8)) and/or translational forces caused by acceleration/deceleration of the vehicle 200, and centrifugal pitch may correspond to pitch caused by centrifugal force that may cause pitching of the load.

The processor 102 may determine a stable area 922 that has travel speeds less than all the maximum travel speed representations, which may be indicated as the area inside of overall forward stability line 924 and overall reverse stability line 926. The stable area 922 indicates travel speeds of the vehicle 200 where the processor 102 has determined that the vehicle 200 would be in a stable condition and not at risk of pitching the load, and/or the vehicle 200 overturning or lifting a wheel.

In response to receiving a request to perform an action from the operator input device 104 (FIG. 1), the processor 102 may compare a level of the operation corresponding to the action to the stable area 922 to determine whether the action may be performed as requested. For example, the processor 102 may receive a signal from the operator input device 104 requesting that the vehicle to travel at a certain travel speed. The processor 102 may compare the requested travel speed to the stable area 922. If the processor 102 determines that the requested travel speed is located within the stable area 922, the processor 102 may determine that the vehicle 200 can travel at the requested travel speed. If the processor 102 determines that the requested travel speed is located outside of the stable area 922, the processor 102 may determine that the requested travel speed may need to be modified to maintain the vehicle 200 in a stable condition. The processor 102 may modify the requested travel speed by lowering the requested travel speed to a modified travel speed that is within the stable area 922. The processor 102 may transmit a signal indicating the requested travel speed (when determined to be within the stable area 922) or the modified travel speed (when the requested travel speed is determined to be outside of the stable area 922) to the drive system 108*a* (FIG. 1) to implement the indicated travel speed.

In some embodiments, depending upon the desired feel of the controls of vehicle 102, the operator input device 104 may allow full range of command, with processor 102 interpreting the range to be within the stable area 922. For example, where the operator input device 104 is a speed control or throttle, the processor 102 may interpret a neutral or zero position of the input device 104 as corresponding to a zero speed, where the vehicle 200 is stationary. Advancing the operator input device 104 to maximum or full speed will result in the processor 102 causing vehicle 102 to accelerate up to the limit of the stable area 922 (with respect to other inputs such as steering, forward-neutral-reverse settings, etc.), which is considered by processor 102 to be 100% allowable speed. It should further be understood that other operational limit representations may also be in play, such as an operational limit of maximum allowable acceleration or deceleration. Thus, moving the throttle to a full open position may not only be limited to a speed within the stable area 922, but also to a limited maximum acceleration that is kept within a stable area. By way of another example, where operator input device 104 commands braking (e.g., a separate brake pedal, or application of brakes integral with a throttle), the maximum allowed braking power, for example, when the accelerator is released but the brake is not applied, or when the brake is applied, may be limited to stay within a stable area, such as stable area 922, to prevent pitching of load 302 and/or rollover or lifting a wheel of vehicle 200.

From the perspective of an operator of such an example, full range of operation of the input device(s) 104 is always available, with the effects of control operation adjusted by processor 102 to maintain stability. In other examples, in addition to processor 102 restricting vehicle operation to a stable area 922, the operator input device(s) 104 may be physically restricted in movement, vibrate, increase resistance, or otherwise signal the operator when the control is advanced to a position that would otherwise cause the vehicle to become unstable apart from the limiting action of processor 102.

In some examples, the processor 102 may further adjust a suspension of the vehicle 200 to increase the stable area 922 for the requested action. For example, the processor 102 may transmit a signal to the suspension system 108*d* to adjust the suspension system 108*d* of the vehicle to increase the stable area 922. The adjustment of the suspension system 108*d* may include increasing or decreasing an amount of resistance of the suspension system 108*d* to compression, extending or contracting portions of the suspension system 108*d*, or some combination thereof. In some other examples, if so configured the processor 102 may adjust other parameters, e.g., the height of the carriage 222, tilt of the mast, to increase the stable area 922 for the requested action.

It should further be understood that the foregoing approach of operational limit representations may be applied to any control and system on vehicle 200. For example, lowering or raising of the mast with a load 302 and/or mast tilt may be limited in speed and/or travel. Where processor 102 determines that lifting a load past a certain height or tilt would result in the vehicle 200 becoming unstable, the carriage 222 may be limited in maximum height/tilt to stay in a stable area.

Still further, it should be understood that, much as the stability polygon 702 may be dynamically recomputed to continually account for changing signals from sensors 106, the operational limit representation 900, which is essentially derived from or otherwise reflects the stability polygon 702, is likewise continually recomputed to account for changing conditions. For example, where a vehicle function that may impact the stability polygon 702 changes, such as a steering angle, the size or the geometry of the stability polygon 702 may be correspondingly changed.

Jerk Reduction

Figure 10:
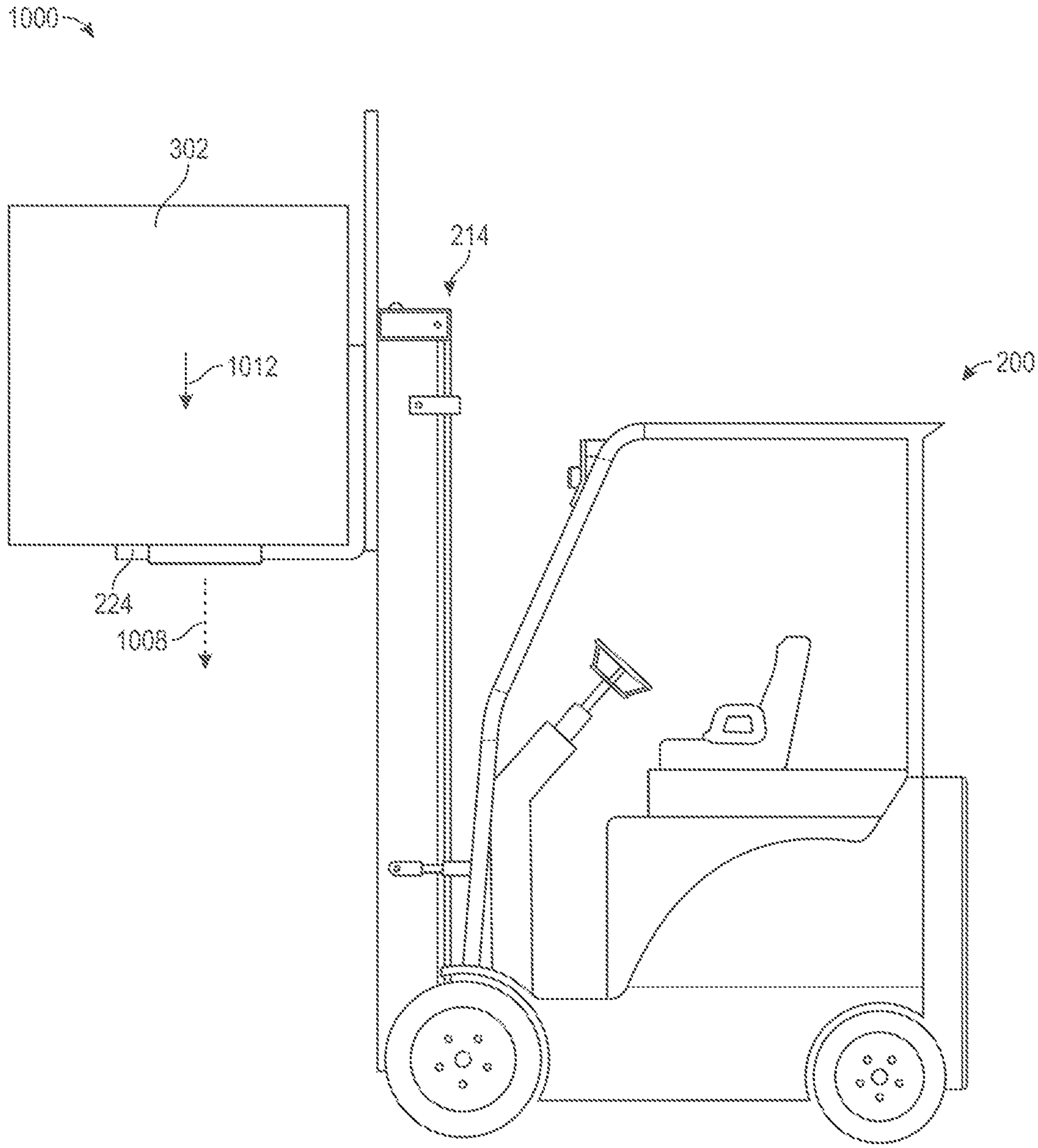
FIG. 10 illustrates another front end equipment arrangement.

FIG. 10 illustrates another front end equipment arrangement 1000. In particular, the front end equipment arrangement 1000 illustrates a support element 224 of front end equipment 214 supporting a load 302. The support element 224 is being lowered as indicated by direction arrow 1008.

During operation of a vehicle 200, certain operations may cause the vehicle 200 to jolt or jerk. While jolting or jerking may not cause the vehicle 200 to enter an unstable condition or cause the load to be pitched, the jolting or jerking may be uncomfortable for an operator of the vehicle 200. Accordingly, it may be preferable to reduce the jolting and jerking of the vehicle 200. The processor 102 (FIG. 1) may implement a jerk reduction operation in order to reduce jolting and jerking of the vehicle 200.

In particular, the processor 102 may determine the magnitude of a force to be caused by an action in response to receiving a request from the operator input device 104 (FIG. 1). In the illustrated example, the processor 102 may have received a signal from the operator input device 104 indicating a request to stop the lowering of the support element 224. In response to receiving the signal, the processor 102 may determine a force, as indicated by a force vector 1012, that would be effected on the load 302 by stopping lowering of the support element 224 at a predefined stopping rate. For example, the processor 102 may retrieve the predefined stopping rate from a memory device of the vehicle 200, may retrieve an indication of a mass or weight of the load 302 from the memory device of the vehicle 200, may receive a signal indicating the mass or weight of the load 302 from the load weight sensor 106*c* (FIG. 1), or some combination thereof. The processor 102 may determine a magnitude of the force vector 1012 based on the predefined stopping rate and the mass or weight of the load 302.

The processor 102 may compare the magnitude of the force vector 1012 with a jerk force threshold. The jerk force threshold may be a predefined magnitude of force that has been determined to cause jolting or jerking of the vehicle 200. In some examples, the processor 102 may further convert the magnitude of the force vector 1012 or the jerk force threshold based on a moment of the force vector 1012 about a potential tip axis of the vehicle 200 to normalize the force vector 1012 and the jerk force threshold about the moment for comparison.

If the processor 102 determines that the magnitude of the force vector 1012 is less than the jerk force threshold, the processor 102 may determine the action may be performed as requested. If the processor 102 determines that the magnitude of the force vector 1012 is greater than the jerk force threshold, the processor 102 may determine that the action should be modified to reduce or prevent jolting or jerking of the vehicle 200. For example, the processor 102 may reduce the predefined stopping rate to a modified stopping rate that causes a magnitude of the force vector 1012 to be less than jerk force threshold. The processor 102 may transmit a signal to the carriage height system 108*b* to indicate the predefined stopping rate (when the magnitude of the force vector 1012 is determined to be less than the jerk force threshold at the predefined stopping rate) or the modified stopping rate (when the magnitude of the force vector 1012 is determined to be greater than the jerk force threshold at the predefined rate). Thus, in embodiments, the action may be modified to reduce or avoid jerk much as commands from an input device may be modified to maintain stability of vehicle 200, as discussed above.

While the jerk reduction operation is described in relation to stopping of the lowering of the support element 224, it is to be understood that a jerk reduction operation may be performed to reduce or prevent jolting or jerking of the vehicle 200 caused by other forces acting upon the vehicle 200, the load 302, or both. For example, jerk reduction operations may be performed based on forces produced by stopping raising/lowering of the support element 224, initiating raising/lowering of the support element 224, acceleration/deceleration of the vehicle 200, initiating tilt adjustment of a mast of the vehicle 200, terminating tilt adjustment of the mast, or some combination thereof. The jerk reduction operations may include reducing a stopping rate of raising/lowering of the support element 224, reducing an initial raising/lowering rate of the support element 224, reducing an acceleration/deceleration of the vehicle, reducing an initial tilt adjustment rate of the mast, reducing a termination rate of the tilt adjustment of the mast, or some combination thereof.

In some implementations, jerk reduction may be accomplished alternatively or additionally by means of speed reduction, e.g., limiting vehicle speed or mast or support element 224 speed to an amount that will not allow the jerk force threshold to be exceeded. In still other implementations, jerk reduction may be accomplished as part of implementing an operational limit, such as operational limit representation 900. In such implementations, the stable area, such as stable area 922, may be computed with respect to reduction or elimination of jerk in addition to ensuring vehicle and load stability. In some situations, jerk reduction or elimination may impose greater restrictions than would otherwise be necessarily imposed to ensure vehicle and load stability. In other situations, vehicle and load stability limits may be within the limits necessary to avoid or reduce jerk, viz. jerk would only be experienced if the vehicle 200 were controlled outside the limits of the stable area.

In some examples, the vehicle 200 may implement one or more jerk reduction operations without determining a magnitude of the force that would be caused by the action. For example, the jerk reduction operations may be implemented by the processor 102 in response to certain conditions of the vehicle 200. Some conditions may include a carriage of the vehicle 200 approaching an end of a carriage stroke of the vehicle, a mast approaching an end of a mast throw of the vehicle 200, or some combination thereof. The jerk reduction operations may include slowing a rate of change of a position of the carriage in response to determining the carriage is approaching the end of the carriage stroke, slowing a rate of change of tilt adjustment of the mast in response to the determination that the mast is approaching the end of the mast throw, or some combination thereof.

Condition-Based Operation Limitation

In some examples, the processor 102 may further limit one or more operations of the vehicle 200 based on conditions of the vehicle 200. In particular, the processor 102 may receive one or more signals from the sensors 106 and may determine one or more conditions of the vehicle 200. The processor 102 may identify an operation to be limited based on the conditions of the vehicle 200 and may limit one or more operations based on the conditions.

For example, the processor 102 may limit a rate of change of a tilt of the mast 216 based on a location of the carriage 222. In particular, the processor 102 may receive a signal from the carriage height sensor **106*e* that indicates a height of the carriage 222 and the processor 102 may determine a height of the carriage 222, based on the signal. The processor 102 may provide for a higher rate of change of the tilt of the mast 216 when the carriage 222 is at a low height than when the carriage 222 is at a higher height. In some examples, the processor 102 may cause the rate of change of the tilt of the mast 216 to vary such that the carriage 222 is translated in the horizontal direction at the same rate regardless of the height of the carriage 222**.

In some examples, the processor 102 may limit a tilt range of the mast 216 based on a height of the carriage 222 and a weight of a load 302 supported by the carriage 222. In particular, the processor 102 may receive a signal from the carriage height sensor **106*e* that indicates a height of the carriage 222. The processor 102 may further receive a signal that indicates a weight of the load 302 from the load weight sensor 106*c* or retrieve a weight of the load 302 from the memory devices 103, which may have previously been entered by an operator. The processor 102 may provide for a greater range of tilt when the carriage 222 is located at a low height and is supporting a relatively light load 302 than when the carriage 222 is located at a higher height and is supporting a relatively heavier load 302**.

In some examples, the processor 102 may limit a speed of height adjustment of the carriage 222 based on a weight of a load 302 supported by the carriage 222, a height of the carriage 222, and/or a tilt of the mast 216. In particular, the processor 102 may receive a signal that indicates a weight of the load 302 from the load weight sensor **106*c* or retrieve a weight of the load 302 from the memory devices 103. The processor 102 may receive a signal that indicates a height of the carriage 222 from the carriage height sensor 106*e*. Further, the processor 102 may receive a signal that indicates a tilt of the mast 216 from the mast tilt sensor 106*d*. The processor 102 may provide for a greater height adjustment rate of the carriage 222 for a light load supported at a low height and with a tilt of the mast 216 being toward the vehicle 200 than when a heavier load is supported at a higher height with the tilt of the mast 216 being away from the vehicle 200**.

In some examples, the processor 102 may limit a travel speed, acceleration, and/or deceleration of the vehicle 200 based on a weight of a load 302 supported by the carriage 222, a height of the carriage 222, a tilt of the mast 216, and/or an angle of the steer wheels **204*b*. The processor 102 may receive a signal indicating the weight of the load 302 from the load weight sensor 106*c*, or as above, may retrieve the weight from a memory device(s) 103 that may have been previously entered by an operator. The processor 102 may receive a signal indicating the height of the carriage 222 from the carriage height sensor 106*e*. The processor 102 may further receive a signal indicating a tilt of the mast 216 from the mast tilt sensor 106*c*. Further, the processor 102 may receive a signal indicating the angle of the steer wheels 204*b* from the angle sensor 106*b*. The processor 102 may provide for a greater travel speed, acceleration, and/or deceleration for a light load supported at a low height with the mast 216 tilted toward the vehicle 200 and a small angle of the steer wheels 204 than when a heavier load is supported at a higher height with the mast 216 tilted away from the vehicle 200 and the steer wheels 204** are at a larger angle.

In examples where condition-based operation limits are implemented, the lowest or most conservative operation limits may be implemented by the processor 102, similar to the contrast between operation within a stable area of an operational limit and operation to reduce or prevent jerk. For example, when the condition-based operation limits are lower or more conservative than the stability and load pitch analysis-based operation limits, viz. operation within a stable area, such as stable area 922 of an operational limit representation 900 (FIG. 9), the processor 102 may implement the condition-based operation limits. When the stability and load pitch analysis-based operation limits are lower or more conservative than the condition-based operation limits, the processor 102 may implement the stability and load pitch analysis-based operation limits.

Exceeded Operation Detection

The vehicle 200 may have one or more restrictions on operation for proper operation and/or suitability for the operating environment. For example, the vehicle 200 may have a restriction on a weight and/or mass of a load (such as the load 302 (FIG. 3)) that may be supported by the vehicle 200, a maximum weight and/or mass of all objects (including the operator) that may be supported by the vehicle, or some combination thereof. At times, the operator may not be aware that an attempted action, if performed, may exceed the restriction. The processor 102 may implement exceeded operation detection and corrective operations to prevent exceeding of the restrictions. The operational limit representation 900 (FIG. 9) discussed above may incorporate such restrictions as part of determining operational limits, e.g., stable area 922 may be additionally or alternatively defined by the restriction(s).

For example, the processor 102 may determine a weight and/or mass of the load 302 upon initial lifting of the load. In particular, the processor 102 may receive a signal indicating a weight and/or mass of the load 302 from the load weight sensor 106*c*. The processor 102 may compare a weight and/or mass of the load 302 with a restricted weight and/or mass for the load 302 to determine whether the vehicle 200 presents proper operation. In response to determining that the weight and/or mass of the load 302 is less than the restricted weight and/or mass for the load, the processor 102 may provide full operation of the vehicle 200, subject to the above-discussed operational limits.

In response to determining that the weight and/or mass of the load 302 is greater than the restricted weight and/or mass for the load, the processor 102 may prevent the vehicle from performing certain operations. In certain examples, the processor 102 may only allow lowering of the carriage of the vehicle 200 and/or tilting forward of the mast of the vehicle 200 to return the load 302 to the surface from which it was initially lifted. In particular, the processor 102 may transmit signals to the carriage height system 108*b* (FIG. 1) and/or the mast tilt system 108*c* (FIG. 1) that cause the carriage to only be lowered and/or the mast to only be tilted forward in response to determining that the weight and/or mass of the load 302 exceeds the restricted weight and/or mass for the load 302. The processor 102 may further cause the operator display system 108*e* to display an indication that the weight and/or mass of the load 302 is greater than the restricted weight and/or mass for the load 302.

Operation Limit Override

During operation of the vehicle 200, an operator of the vehicle 200 may request actions to be performed by the vehicle 200 where such action has a limitation imposed on it. These actions may exceed one or more of the limitations imposed on operations (such as limitations of operations based on the stability polygon 702 (FIG. 7), load pitch analysis, jerk reduction operations, or some combination thereof) described herein. For example, a stop may need to be made at a deceleration rate that is greater than a currently limited deceleration rate to hinder a load 302 potentially sliding off support element 224. In ordinary operation, however, the processor 102 may limit available deceleration rate when the throttle is released (and thus increase stopping distance) to keep the vehicle 200 within operational limits so as to prevent load 302 from toppling. However, activating a brake input may override the deceleration rate and bring the vehicle to a stop. Thus, the processor 102 may provide for override actions that override the limitations on operations.

In particular, the vehicle 200 may be programmed to allow one or more actions to be performed without limiting operations of the vehicle 200 associated with the actions. For example, a manufacturer of the vehicle 200, an end user, or an authorized operator may signal the processor 102 to perform the operator-commanded actions regardless of the limitations on the operations. For example, the processor 102 may be signaled to allow a request to brake the vehicle 200 to override the limitations on deceleration of the vehicle 200. In particular, the processor 102 may cause a brake of the vehicle 200 to be applied at a brake level indicated by a signal received from the operator input device 104 regardless of the deceleration of the vehicle 200 caused by the braking and any limitations on deceleration of the vehicle 200. The processor 102 may further be programmed, configured, or signalled by the manufacturer, the end user, or the authorized operator to allow other actions to override the limits.

Operator Skill Level

As operators of the vehicle 200 become more experienced with the vehicle 200 and/or receive more training on the vehicle 200, the operators may gain higher skill levels with the vehicle. As a skill level of the operator progresses, an operator or manager may want to have fewer limitations on vehicle 200 operations based on operator's experience and his or her skill level. Further, a skilled operator may be less sensitive to conditions of the vehicle 200 that may make less skilled operators uncomfortable during operation. For example, an experienced operator may be sufficiently skilled to be comfortable with full-speed operation of the various systems of vehicle 200. An inexperienced operator potentially getting used to the vehicle controls, in contrast, may benefit from diminished control sensitivities and limits upon operational speeds, to give the inexperienced operator more time to adjust to possible erroneous inputs and/or make corrections. The operational limits discussed above (FIG. 9) may be alternatively or additionally employed to tailor the handling of a vehicle 200 to a level better suited to an operator's skill level. Thought of from another perspective, the operator's skill level can be considered another factor that processor 102 may use to determine appropriate operational limits, along with the various signals from sensors 106 discussed above.

Figures 11, 12:
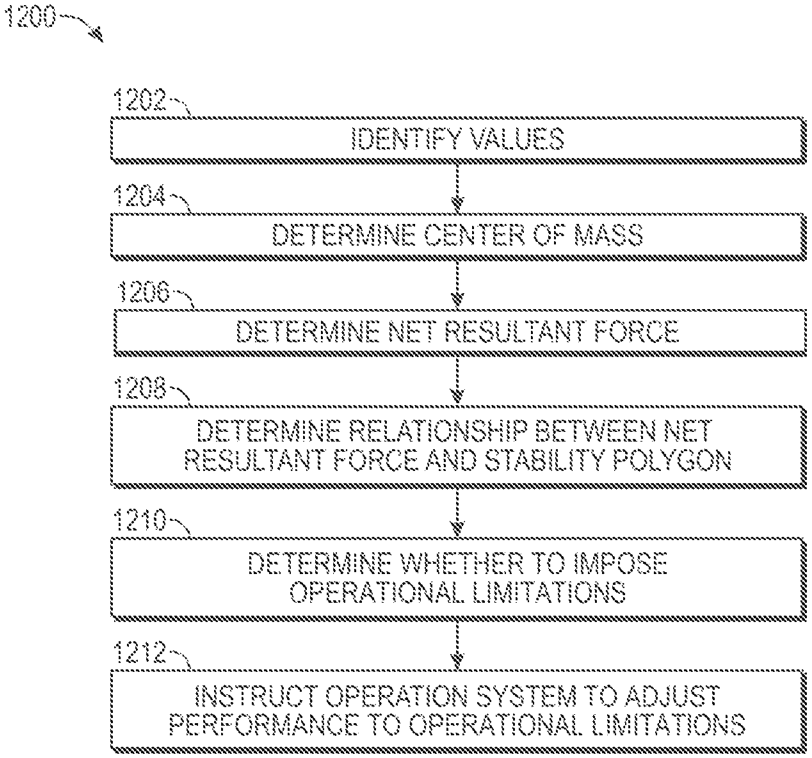
FIG. 11 illustrates an example operator skill level operation reduction table.
FIG. 12 illustrates an example procedure for determining stability of a vehicle.

FIG. 11 illustrates an example operator skill level operation reduction table 1100, which may essentially provide data inputs to be used in determining operational limits, and may be used in conjunction with signals from sensors 106. In particular, the operator skill level operation reduction table 1100 may indicate a level of reduction of limitation of operations based on a skill level of the operator of the vehicle 200. Further, the operator skill level operation reduction table 1100 may indicate a level of sensitivity to conditions of the vehicle that may cause a limitation of operations. The operator skill level operation reduction table 1100 may be utilized by the processor 102 to determine when to implement operation limitations beyond operational limits determined from sensors 106, and an amount by which to limit the operation, based on an operator skill level.

The processor 102 may receive a signal indicating an operator skill level of the operator from the operator input device 104, or another suitable input method. In some examples, the processor 102 may store an indication of the operator skill level within the memory devices 103 of the vehicle 200. The processor 102 may utilize the operator skill level in determining when to implement limits on operations and/or how much each of the operations should be limited based on the current operator skill level.

The operator skill level operation reduction table 1100 may be stored in the memory devices 103. The processor 102 may access the operator skill level operation reduction table 1100. The processor 102 may identify one or more limitation amounts and/or limitation sensitivities associated with the current operator skill level.

In the illustrated example, the operator skill level operation reduction table 1100 includes limitation amounts and limitation sensitivities for three operator level skill levels, as indicated by first column 1102, second column 1104, and third column 1106. Each skill level, as may be seen, includes entries for multiple operational parameters of a vehicle 200. Other embodiments may have more or fewer skill levels, as may be determined by the needs of a given implementation, or may provide for creation of an arbitrary number of levels with varying limits. Likewise, other embodiments may vary the number and/or type of operational parameters depending upon the specifics of a given implementation.

In response to receiving a request to perform an action from the operator input device 104 (FIG. 1), the processor 102 may identify a sensitivity level for operations associated with the action. For example, the processor 102 may identify the carriage height speed reduction row 1108 and a corresponding carriage height speed reduction percentage associated with each operator skill level in the illustrated example, shown in first column 1102, second column 1104, and third column 1106, respectively. When performing the jerk reduction analysis, the processor 102 may utilize a carriage height speed reduction percentage corresponding to the determined or indicated operator skill level. For example, the carriage height speed reduction row 1108 may indicate a jerk force threshold for a given level of operator that may be utilized in determining whether to modify an action requested by the operator to reduce jolting or jerking of the vehicle 200. In another example, in addition or alternative to jerk reduction, the entries in the carriage height speed reduction row 1108 may be used to slow the speed at which the carriage height adjusts for more novice operators, and/or may provide a larger margin of error to hinder load 302 from toppling and/or vehicle 200 tipping or wheel lifting Some other sensitivities that may be indicated in the operator skill level operation reduction table 1100 include vehicle stability sensitivity (not shown, which may indicate the predetermined distance to be utilized in determining stability of the vehicle 200 based on the stability polygon 702 (FIG. 7)), load pitch sensitivity (not shown, which may indicate how close a magnitude of combined forces that may cause pitching of a load can get to a resistance force produced by friction prior to limiting operation), or some combination thereof. Other entries 1110 include travel reduction, which effectively places an artificial limit on the top speed of vehicle 200 for more novice operators, acceleration reduction, which places an artificial limit on how aggressively the vehicle 200 may accelerate, and tilt speed reduction, which can limit the speed at which the mast may tilt, to aid a novice operator in learning load handling.

In response to determining that an operation should be limited, the processor 102 may identify an amount by which to reduce the operation below a maximum operation value. For example, the processor 102 may identify the travel speed reduction row 1110 and a travel speed reduction amount associated with the operator skill level in the illustrated example. The processor 102 may modify a requested travel speed to be a certain amount below a maximum allowed travel speed (which may be determined based on the operational limit representation 900 (FIG. 9)). Still other reduction amounts that may be indicated in the operator skill level operation reduction table 1100 include, e.g., an acceleration/deceleration reduction amount, a tilt angle amount, a tilt angle adjustment rate, a carriage height amount, a carriage height adjustment rate, or some combination thereof. Although the adjustment values listed in each of the columns 1102, 1104, and 1106 of table 1100 are shown in percentages, this is for example only. It should be understood that the actual values may be stored in any suitable data format as may be required by processor 102.

FIG. 12 illustrates an example procedure 1200 for determining stability of a vehicle (such as the vehicle 200 (FIG. 2)). The procedure 1200 may be performed, in whole or in part, by a processor, such as processor 102 (FIG. 1) during operation of a vehicle, such as a vehicle 200 equipped with one or more sensors, such as sensors 106.

At operation 1202, the processor may identify one or more values received from the sensors (FIG. 1). In particular, the processor may identify one or more signals received from the sensors that indicate one or more of the values measured by the sensors.

At operation 1204, the processor may determine a center of mass of an arrangement that includes the vehicle. In arrangements where the vehicle is not supporting a load, the processor may determine the center of mass of the arrangement based on the components of the vehicle (i.e., a body of the vehicle and front end equipment of the vehicle). In an arrangement where the vehicle is supporting a load, the processor may determine the center of mass of the arrangement based on the components of the vehicle and the load. The processor may perform one or more of the features for determining the center of mass described in relation to FIG. 3 and FIG. 4 to determine the center of mass of the arrangement.

At operation 1206, the processor may determine a net resultant force based on the values received from the sensors. In particular, the processor may determine one or more forces acting upon the center of mass of the arrangement. The processor may perform one or more of the features for determining a net resultant force described in relation to FIG. 5 and FIG. 6 to determine the net resultant force.

At operation 1208, the processor may determine a relationship between the net resultant force and a stability polygon for the vehicle. In particular, the processor may determine whether the net resultant force is directed through the stability polygon that is superimposed at a base of the vehicle. The processor may perform one or more of the features for determining a relationship between a net resultant force and a stability polygon as described in relation to FIG. 7 to determine the relationship between the net resultant force and the stability polygon.

At operation 1210, the processor may determine a maximum allowable limit of operation, e.g., an operational limit representation (FIG. 9). In particular, the processor may determine whether to impose operational limitations based on the relationship between the net resultant force and the stability polygon. The processor may perform one or more of the features for determining whether to impose operational limitations as described in relation to FIG. 7 to determine whether to impose the limits. For example, the processor may determine whether to impose operational limitations based on whether a portion of the stability polygon through which the net resultant force is directed is within a predetermined distance of a side of the stability polygon.

At operation 1212, the processor may signal one or more of the operation systems 108 (FIG. 1) to adjust performance and/or operation in response to the processor determining to impose operational limitations. In particular, the processor may transmit one or more signals to one or more of the operation systems that instruct the operation systems to perform operations at some level less than the performance level commanded via an operator input device, such as operator input device 104. Operational limitations may include, e.g., limiting a maximum drive speed of the vehicle, limiting an acceleration and/or deceleration of the vehicle, limiting a maximum height of the carriage, limiting a speed of adjustment of the height of the carriage, limiting a tilt of the mast, limiting a speed of adjustment of tilt of the mast, changing a color of a portion of an operator display, displaying a warning on the operator display, emitting a sound, applying a force to the operator, or some combination thereof. In instances where the processor determines not to impose operational limitations, operation 1212 may be omitted from the procedure 1200.

Figure 13:
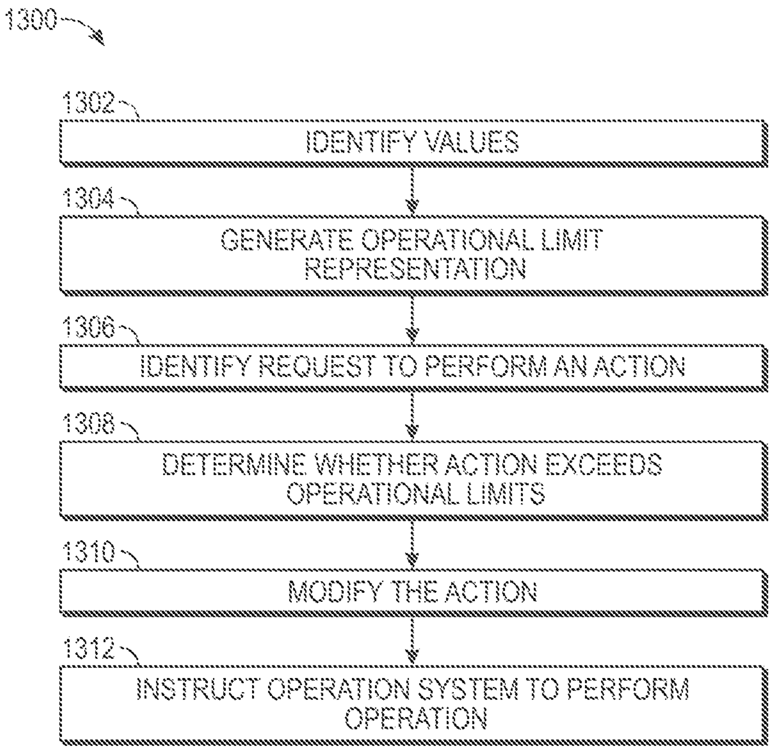
FIG. 13 illustrates an example procedure of preventative stability operation for a vehicle.

FIG. 13 illustrates an example procedure 1300 of preventative stability operation for a vehicle (such as the vehicle 200 (FIG. 2)). The procedure 1300 may be performed by a processor such as processor 102 (FIG. 1) during operation of the vehicle.

At operation 1302, the processor may identify one or more values received from sensors, such as sensors 106 (FIG. 1). In particular, the processor may identify one or more signals received from the sensors that indicate one or more of the values measured by the sensors.

At operation 1304, the processor may generate one or more operational limit representations (such as the operational limit representation 900 (FIG. 9)). For example, the processor may determine a net resultant force acting upon an arrangement of the vehicle and determine a relationship between the net resultant force and a stability polygon of the vehicle, such as described in relation to FIG. 3 through FIG. 7. The processor may further perform the load pitch analysis, such as described in relation to FIG. 8, in arrangements where the vehicle is supporting a load. The processor may perform one or more of the features for generating an operational limit representation, such as described in relation to FIG. 9, to generate the one or more operational limit representations.

At operation 1306, the processor may identify a request to perform an action. In particular, the processor may identify a signal indicating a request for the vehicle to perform an action received from an operator input device, such as operator input device 104 (FIG. 1). The action may be associated with one or more operations that correspond to the operational limit representations.

At operation 1308, the processor may determine whether the requested action would exceed operational limits of one or more operations. In particular, the processor may determine one or more operations to be performed by the operation systems to achieve the requested action and may identify one or more of the operational limit representations that correspond to the one or more operations. The processor may compare each of the determined operations to be performed to achieve the requested action with the corresponding operational limit representations to determine whether the operations fall within the stable areas (such as the stable area 922 (FIG. 9)) of the corresponding operational limit representations. The processor may determine that the requested action exceeds the operational limits based on any of the operations falling outside of the stable areas of the corresponding operational limit representations, or may determine that the requested action does not exceed the operational limits if all the operations fall within the stable areas of the corresponding operational limit representations.

At operation 1310, the processor may modify the action in response to determining that the action exceeds the operational limits. In particular, the processor may modify actions that exceed the operational limits to a modified action, where all of the operations to be performed to achieve the modified action fall within the stable areas of the corresponding operational limit representations. For example, the processor may reduce values of one or more of the operations (such as reducing a travel speed, reducing an amount of acceleration/deceleration, reducing a rate of change of a height of a carriage of the vehicle, reducing a rate of change of tilt of a mast of the vehicle, or some combination thereof) associated with the requested action to produce the modified action. Note that modification, as used here, does not necessarily mean actual modification of a signal to an operational system. Rather, modification may simply mean mapping a received input from the input device to an appropriate output that will result in operations within the stable area. For example, an operator may request full throttle (100%), which the processor may map to the maximum allowable speed that is contained within the stable area. Where the 100% will exceed determined operational limits, the 100% value will not result in an actual 100%, but rather the maximum allowable speed. In instances where the processor determines that the action does not exceed the operational limits, operation 1310 may be omitted from the procedure 1300.

In addition to adjustments to keep operational parameters within a stable area of operation, other adjustments may be made here that are not necessarily stability related. For example, where operator skill levels are implemented, the action may be modified in operation 1310 to keep any requested action to within allowable limits for the designated operator skill level (FIG. 11). Other modifications may also be made, e.g., geo-fencing limitations, where a sensor can detect the location of the vehicle within different parts of a designated operations area. Different locations may have different operational limitations. For example, a yard that has both an exterior lot area and an interior warehouse area may be traversed by a vehicle for handling materials in both the exterior lot and interior warehouse. Operations in the exterior lot may be allowed at a higher speed than in the interior warehouse, as the exterior lot may offer greater maneuvering space and distances. In contrast, in the interior warehouse lighting may be poorer, corridors narrower, and goods and materials more closely packed, necessitating a slower maximum operational speed. A sensor may be able to detect the vehicle transitioning between interior and exterior areas, and adjust or modify requested operations or actions to remain within limits set by the operator or manager of the yard.

At operation 1312, the processor may instruct one or more of the operation systems (such as operation systems 108 in FIG. 1) to perform one or more operations associated with the requested action or the modified action. In instances where the processor produces the modified action in operation 1310, the processor may transmit one or more signals to one or more of the operation systems that cause the operation systems to perform operations to achieve the modified action, viz. to perform the operations within the stable area. In instances where the processor determines that action does not exceed the operational limits, the processor may transmit one or more signals to one or more of the operation systems that cause the operation systems to perform operations to achieve the requested action, e.g., to perform an operation of 100% at the maximum available operation.

Figure 14:
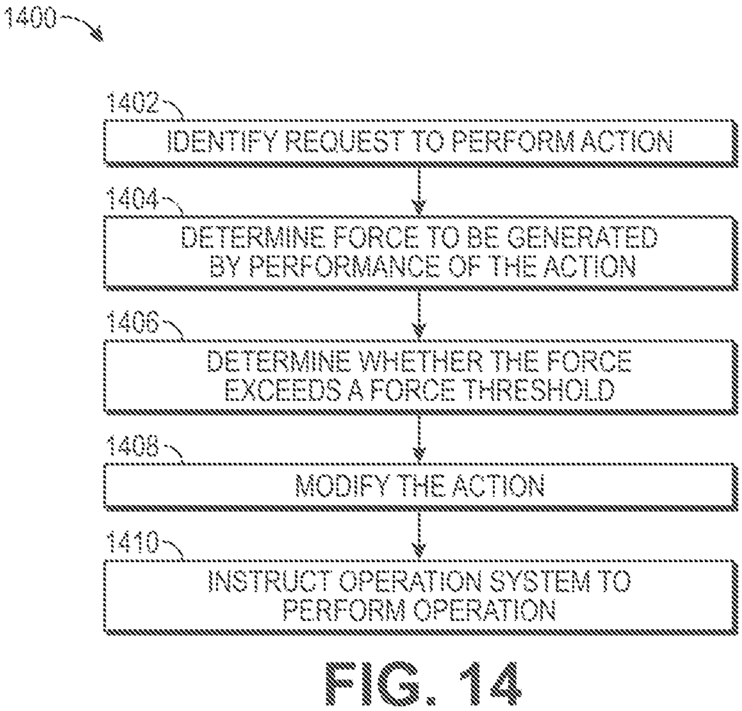
FIG. 14 illustrates an example procedure of jolt reduction operation for a vehicle.

FIG. 14 illustrates an example procedure 1400 of jerk reduction operation for a vehicle (such as the vehicle 200 (FIG. 2)). The procedure 1400 may be performed by a processor, such as the processor 102 (FIG. 1) during operation of the vehicle.

At operation 1402, the processor may identify a request to perform an action. In particular, the processor may identify a signal indicating a request for performance of an action received from an operator input device, such as the operator input device 104 (FIG. 1).

At operation 1404, the processor may determine a force to be generated by performance of the action. In particular, the processor may determine one or more operations to be performed to achieve the requested action. The processor may determine a magnitude and direction of a force to be produced by performance of the operations, as described in relation to FIG. 10.

At operation 1406, the processor may determine whether the force exceeds a force threshold. In particular, the processor may compare a magnitude of the force to be produced by performance of the operations to a force threshold indicating a maximum magnitude, as described in relation to FIG. 10. In some examples, the force threshold may vary depending on the direction of the force to be produced.

At operation 1408, the processor may modify the requested action to a modified action in response to determining that the force to be produced exceeds the force threshold. Modification may be similar to modification of actions as described above with respect to operation 1310 of procedure 1300. In particular, the processor may modify the action such that the operations to be performed to achieve the requested action produce a force that does not exceed the force threshold. For example, the processor may reduce values of one or more of the operations (such as reducing a travel speed, reducing an amount of acceleration/deceleration, reducing a rate of change of a height of a carriage of the vehicle, reducing a rate of change of tilt of a mast of the vehicle, or some combination thereof) associated with the requested action to produce the modified action. In instances where the processor determines the requested action does not exceed the force threshold, operation 1408 may be omitted from the procedure 1400.

At operation 1410, the processor may instruct one or more of vehicle operation systems, such as the operation systems 108 (FIG. 1), to perform one or more operations associated with the requested action or the modified action. In instances where the processor produces the modified action in operation 1408, the processor may transmit one or more signals to one or more of the operation systems that cause the operation systems to perform operations to achieve the modified action. In instances where the processor determines that the force associated with the action does not exceed the force threshold, the processor may transmit one or more signals to one or more of the operation systems that cause the operation systems to perform operations to achieve the requested action.

Figure 15:
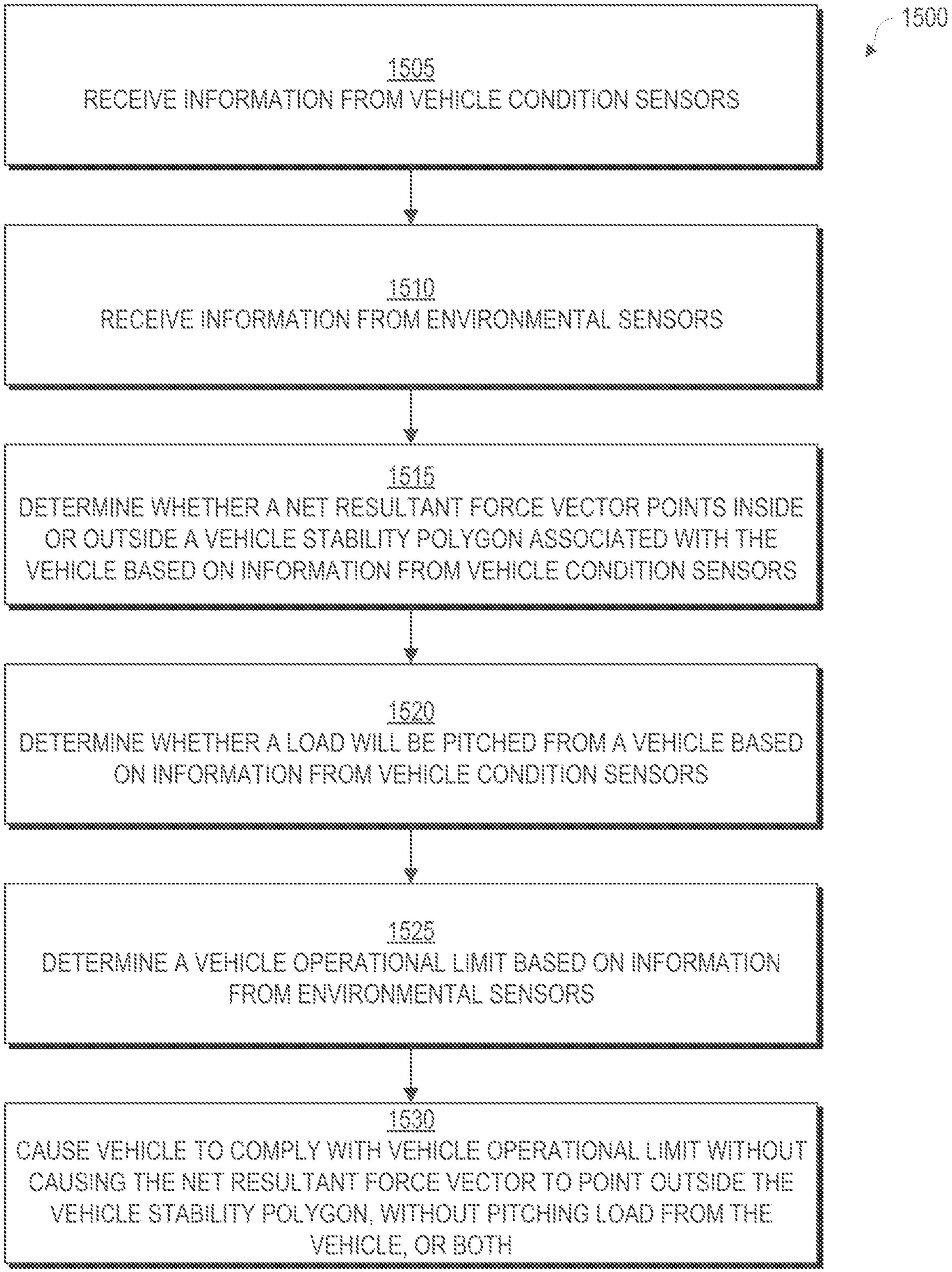
FIG. 15 illustrates an example procedure of determining a vehicle operational limit.

FIG. 15 illustrates an example procedure 1500 for determining a vehicle operational limit. A processor, such as processor 102 (FIG. 1), receives information from vehicle condition sensors, for example, sensors 106 that indicate values of the conditions of the vehicle (such as vehicle 200 (FIG. 2)) at operation 1505.

At operation 1510, the processor receives information from environmental sensors, for example, sensors 106 that sense and/or measure environmental conditions around the vehicle. The processor may determine whether a net resultant force vector points inside or outside a vehicle stability polygon, such as described in relation to FIG. 3 through FIG. 7, associated with the vehicle based on information from vehicle condition sensors at operation 1515. The processor may also determine whether a load, such as load 302 (FIG. 3), will be pitched from the vehicle based on information from vehicle condition sensors at operation 1520.

At operation 1525 the processor may determine a vehicle operational limit based on information from environmental sensors. At operation 1530 the processor may cause the vehicle to comply with the vehicle operational limit without causing the net resultant force vector to point outside the vehicle stability polygon, without pitching load from the vehicle, or both, for example, via sending signals to operations systems, such as operation systems 108.

Multiple examples of systems, apparatuses, and methods for controlling a vehicle are described herein. Different examples of the systems, apparatuses, and methods described herein may perform different procedures. In particular, the examples disclosed herein may perform procedure 1200, procedure 1300, procedure 1400, procedure 1500, or some combination thereof. In some examples, a system for controlling a vehicle is described herein. The system may include sensors and a processor coupled to the sensors. The processor may identify one or more values received from the one or more sensors, wherein the one or more values are associated with one or more conditions of the vehicle, and determine, based on the one or more values, a net resultant force vector of one or more forces acting on a center of mass of the vehicle. The processor may further determine a relationship between the net resultant force vector and a stability polygon that is superimposed at a base of the vehicle, and determine whether to initiate a stability assistance operation based on the relationship between the net resultant force vector and the stability polygon.

Further, a computer-readable media having instruction stored for thereon for implementation within a vehicle is disclosed herein. In particular, the computer-readable media having instructions stored thereof, wherein the instructions, in response to execution by a processor of a vehicle, may cause the processor to identify one or more values received from one or more sensors, wherein the values are associated with one or more instantaneous conditions of the vehicle, and determine, based on the one or more values, a net resultant force vector of one or more forces acting on a center of mass of the vehicle. The instructions may further cause the processor to determine a relationship between the net resultant force vector and a stability polygon that is superimposed at a base of the vehicle, and determine, based on the relationship between the net resultant force vector and the stability polygon, whether to initiate a stability assistance operation.

Further, a method for controlling a vehicle is described herein. The method may include identifying one or more values received from one or more sensors of the vehicle, wherein the one or more values are associated with one or more instantaneous conditions of the vehicle, and generating an operational limit representation that corresponds to an operation of the vehicle, wherein the operational limit representation indicates operational limits of the operation based on the one or more values. Further, the method may include identifying a request to perform an action associated with the operation, determining that the action exceeds the operational limits of the operation based on the operational limit representation, and modifying the action in response to the determination that the action exceeds the operational limits.

It will be apparent to those skilled in the art that various modifications and variations can be made in the disclosed examples of the disclosed device and associated methods without departing from the spirit or scope of the disclosure. Thus, it is intended that the present disclosure covers the modifications and variations of the examples disclosed above provided that the modifications and variations come within the scope of any claims and their equivalents.

The invention claimed is:

1. A system for improving operation of a materials-handling vehicle, the system comprising:

one or more user input devices configured to receive from an operator a request to perform an action; and a processor within the materials-handling vehicle, wherein the processor is configured to:

determine, before performing the action requested by the operator, a magnitude of a force that would result by performing the action requested by the operator, wherein the force acts either on the materials-handling vehicle or on a load carried by the materials-handling vehicle, and wherein the force results from either initiation or termination of a movement of the materials-handling vehicle or a part of the materials-handling vehicle;

determine whether the magnitude of the force would exceed a threshold if the action is performed as requested, wherein whether the magnitude of the force would exceed the threshold is independent of whether the action would cause the materials-handling vehicle to become unstable;

in response to determining that the magnitude of the force would exceed the threshold, cause the materials-handling vehicle to perform the action modified so as to reduce the magnitude of the force and thereby not exceed the threshold; and if it is determined in response to determining that the magnitude of the force would not exceed the threshold, cause the materials-handling vehicle to perform the action as requested by the operator without modification to reduce the magnitude of the force.

2. The system of claim 1, wherein the magnitude of the force is computed based on a force vector and a moment of the force vector about a potential tip axis of the materials-handling vehicle.

3. The system of claim 1, wherein the action requested by the user comprises stopping lowering a load carried by the materials-handling vehicle.

4. The system of claim 1, wherein the action requested by the user comprises stopping raising a load carried by the materials-handling vehicle.

5. The system of claim 1, wherein the action requested by the user comprises initiating lowering a load.

6. The system of claim 1, wherein the action requested by the user comprises initiating raising a load.

7. The system of claim 1, wherein the action requested by the user comprises accelerating the materials-handling vehicle.

8. The system of claim 1, wherein the action requested by the user comprises decelerating the materials-handling vehicle.

9. The system of claim 1, wherein the action requested by the user comprises initiating tilting a load.

10. The system of claim 1, wherein the action requested by the user comprises stopping tilting a load.

11. The system of claim 1, wherein the action modified so as to reduce the magnitude of the force is the action requested by the operator performed at a slower rate.

12. The system of claim 1, wherein the processor is further configured to determine whether the action, if performed as requested, would cause the materials-handling vehicle to be unstable and, if so, modify the action to maintain stability of the materials-handling vehicle.

13. The system of claim 1, wherein the processor is further configured to determine whether the action, if performed as requested, would cause a load to be pitched and, if so, modify the action to maintain stability of the load.

14. The system of claim 1, wherein the processor is further configured to receive one or more vehicle values from one or more vehicle sensors, wherein the one or more vehicle values are associated with one or more conditions of the materials-handling vehicle, and wherein the magnitude of the force is determined based at least in part on the one or more vehicle values.

15. The system of claim 1, further comprising:

a load weight sensor configured to measure a weight of a load, wherein the processor is configured to access the weight of the load measured by the sensor, and wherein the magnitude of the force is determined based at least in part on the weight of the load.

16. The system of claim 1, further comprising:

a memory, coupled to the processor, in which is stored a weight of a load, and wherein the magnitude of the force is determined based at least in part on the weight of the load.

17. The system of claim 1, wherein:

in response to determining that the magnitude of the force would exceed the threshold, the processor causes the materials-handling vehicle to perform the action modified so as to reduce the magnitude of the force, even though the action requested by the operator would not cause the vehicle to experience a force vector that is pointed at or beyond an edge of a stability polygon.

18. A method of improving operation of a materials-handling vehicle, the method comprising:

receiving from an operator a request to perform an action;

determining, before performing the action requested by the operator, a magnitude of a force acting on a load carried by the materials-handling vehicle, the materials-handling vehicle, or both as a result of the action requested by the operator, wherein the force acts either on the materials-handling vehicle or on a load carried by the materials-handling vehicle, and wherein the force results from either initiation or termination of a movement of the materials-handling vehicle or a part of the materials-handling vehicle;

determining whether the magnitude of the force would exceed a threshold if the action is performed as requested, wherein whether the magnitude of the force would exceed the threshold is independent of whether the action would cause the materials-handling vehicle to become unstable;

in response to determining that the magnitude of the force would exceed the threshold, causing the materials-handling vehicle to perform the action modified so as to reduce the magnitude of the force and thereby not exceed the threshold; and in response to determining that the magnitude of the force would not exceed the threshold, causing the materials-handling vehicle to perform the action as requested by the operator without modification to reduce the magnitude of the force.

19. The method of claim 18, wherein the action requested by the operator comprises one of initiating or stopping one of lowering of the load, raising of the load, accelerating the materials-handling vehicle, decelerating the materials-handling vehicle, or tilting of the load.

20. The method of claim 18, wherein causing the materials-handling vehicle to perform the action modified so as to reduce the force comprises causing the materials-handling vehicle to perform the action at a slower rate.

21. The method of claim 18, further comprising:

measuring a weight of the load; and using the weight of the load to determine the magnitude of the force.

22. The method of claim 18, wherein the conditional step of causing the materials-handling vehicle to perform the action modified so as to reduce the magnitude of the force is performed even though the action requested by the operator would not cause the vehicle to experience a force vector that is pointed at or beyond an edge of a stability polygon.

23. A non-transitory computer-readable medium having instructions stored thereon, wherein the instructions, in response to execution by a processor on board a materials-handling vehicle, cause the processor to improve operation of a materials-handling vehicle, the instructions comprising:

instructions to determine, in response to a request by an operator to perform an action requested, a magnitude of a force acting on a load carried by the materials-handling vehicle, the materials-handling vehicle, or both as a result of the action requested by the operator, wherein the force acts either on the materials-handling vehicle or on a load carried by the materials-handling vehicle, and wherein the force results from either initiation or termination of a movement of the materials-handling vehicle or a part of the materials-handling vehicle;

instructions to determine whether the magnitude of the force would exceed a threshold if the action is performed as requested, wherein whether the magnitude of the force would exceed the threshold is independent of whether the action would cause the materials-handling vehicle to become unstable;

instructions to cause, in response to determining that the magnitude of the force would exceed the threshold, the materials-handling vehicle to perform the action modified so as to reduce the magnitude of the force and thereby not exceed the threshold; and instructions to cause, in response to determining that the magnitude of the force would not exceed the threshold, the materials-handling vehicle to perform the action as requested by the operator without modification to reduce the magnitude of the force.

24. The non-transitory computer-readable medium of claim 23, wherein the action requested by the operator comprises one of initiating or stopping one of lowering of the load, raising of the load, accelerating the materials-handling vehicle, decelerating the materials-handling vehicle, or tilting of the load.

25. The non-transitory computer-readable medium of claim 23, wherein the instructions to cause, in response to determining that the magnitude of the force would exceed the threshold, the materials-handling vehicle to perform the action modified so as to reduce the magnitude of the force comprise instructions to cause the action to be performed at a slower rate.

26. The non-transitory computer-readable medium of claim 23, wherein the instructions to determine, in response to a request by an operator to perform an action requested, a magnitude of a force acting on the load carried by the materials-handling vehicle as a result of the action requested by the operator comprise instructions to calculate the magnitude of the force using a weight of the load.

27. The non-transitory computer-readable medium of claim 23, wherein the instructions to cause, in response to determining that the magnitude of the force would exceed the threshold, the materials-handling vehicle to perform the action modified so as to reduce the magnitude of the force are executed even though the action requested by the operator would not cause the vehicle to experience a force vector that is pointed at or beyond an edge of a stability polygon.

* * * * *